(12) United States Patent
Russell

(10) Patent No.: US 10,034,109 B2
(45) Date of Patent: Jul. 24, 2018

(54) ACOUSTIC TRANSDUCER SYSTEMS WITH POSITION SENSING

(71) Applicant: AUDERA ACOUSTICS INC., Schomberg (CA)

(72) Inventor: David Russell, Toronto (CA)

(73) Assignee: Audera Acoustics Inc., Schomberg (CA)

( * ) Notice: Subject to any disclaimer, the term of this patent is extended or adjusted under 35 U.S.C. 154(b) by 0 days.

(21) Appl. No.: 15/093,832

(22) Filed: Apr. 8, 2016

(65) Prior Publication Data

US 2016/0302018 A1    Oct. 13, 2016

Related U.S. Application Data

(60) Provisional application No. 62/210,672, filed on Aug. 27, 2015, provisional application No. 62/145,477, filed on Apr. 9, 2015.

(51) Int. Cl.
*H04R 29/00* (2006.01)
*H04R 9/04* (2006.01)
(Continued)

(52) U.S. Cl.
CPC ............ *H04R 29/003* (2013.01); *G01C 3/02* (2013.01); *H04R 3/002* (2013.01); *H04R 9/063* (2013.01);
(Continued)

(58) Field of Classification Search
CPC . H04R 9/043; H04R 9/06; H04R 7/16; H04R 1/00; H04R 29/003; H04R 9/045;
(Continued)

(56) References Cited

U.S. PATENT DOCUMENTS 3,046,362 A * 7/1962 White .................... H04R 7/12
                                                        181/164
3,821,473 A   6/1974 Mullins
(Continued)

FOREIGN PATENT DOCUMENTS

DE    2853676 A1 *  6/1980 ............. H04R 3/002
DE    3917556 A1 * 12/1990 ............... G01D 5/26
(Continued)

OTHER PUBLICATIONS

Yasin et al, A simple design of vibration sensor using fiber optic displacement sensor, Nov. 2010.*
(Continued)

*Primary Examiner* — Davetta W Goins
*Assistant Examiner* — Kuassi Ganmavo
(74) *Attorney, Agent, or Firm* — Bereskin & Parr LLP/S.E.N.C.R.L., s.r.l.

(57) ABSTRACT

Acoustic transducer systems involving position sensing, and methods of operating and providing the acoustic transducer systems, are described herein. The described systems include a driver motor with a voice coil structure coupled to a diaphragm, the voice coil structure movable within an air gap in response to a magnetic flux; a position sensor to generate a position signal to represent a displacement of the diaphragm; and a system controller to modify an input signal based on the position signal and transmit the modified input signal to a voice coil so the voice coil can move in response to the modified input signal. The position sensor can generate the position signal based on optical sensing or strain measurements.

17 Claims, 22 Drawing Sheets

(51) Int. Cl.
*G01C 3/02* (2006.01)
*H04R 9/06* (2006.01)
*H04R 3/00* (2006.01)
*G01L 1/04* (2006.01)

(52) U.S. Cl.
CPC ............... *G01L 1/04* (2013.01); *H04R 9/043* (2013.01); *H04R 9/06* (2013.01)

(58) Field of Classification Search
CPC ........ H04R 9/046; H04R 3/002; H04R 9/063; G01C 3/02; G01L 1/04
See application file for complete search history.

(56) References Cited

U.S. PATENT DOCUMENTS

| | | | |
|---|---|---|---|
| 4,207,430 A | | 6/1980 | Harada |
| 4,256,923 A | * | 3/1981 | Meyers ............... H04R 3/002 381/96 |
| 4,309,618 A | * | 1/1982 | Carter, Jr. ............ G01S 17/42 250/559.38 |
| 4,568,845 A | * | 2/1986 | Uehara ............... G11B 7/0935 310/13 |
| 4,573,189 A | | 2/1986 | Hall |
| 4,727,584 A | * | 2/1988 | Hall .................. H04R 3/002 381/400 |
| 4,821,328 A | * | 4/1989 | Drozdowski ........ H04R 3/002 381/59 |
| 6,137,580 A | * | 10/2000 | Gelbart ............... G11B 7/0908 250/201.1 |
| 6,369,898 B1 | * | 4/2002 | Van Saarloos ...... A61F 9/00804 356/497 |
| 7,961,892 B2 | * | 6/2011 | Fedigan .............. H04R 9/063 381/117 |
| 8,284,982 B2 | | 10/2012 | Bailey |
| 2003/0109196 A1 | * | 6/2003 | Wolf .................. B24B 37/013 451/6 |
| 2005/0031134 A1 | * | 2/2005 | Leske ................ H04R 29/003 381/59 |
| 2007/0165896 A1 | * | 7/2007 | Miles ................. H04R 23/006 381/356 |
| 2007/0189577 A1 | * | 8/2007 | Tsuda ................ H04R 9/027 381/415 |
| 2008/0247593 A1 | * | 10/2008 | Sprinkle ............. H04R 1/025 381/387 |
| 2009/0060213 A1 | * | 3/2009 | Bachmann .......... H04R 3/002 381/59 |
| 2010/0245799 A1 | * | 9/2010 | Kim ................... G01C 3/08 356/3 |
| 2013/0272563 A1 | * | 10/2013 | Boyd ................. H04R 1/00 381/406 |
| 2014/0241536 A1 | | 8/2014 | Adams et al. |
| 2015/0086027 A1 | * | 3/2015 | Moser ................ H04R 3/002 381/59 |
| 2016/0094917 A1 | * | 3/2016 | Wilk .................. H04R 3/007 381/398 |

FOREIGN PATENT DOCUMENTS

| | | | | |
|---|---|---|---|---|
| EP | 0048116 A1 | * | 3/1982 | ............ H04R 3/002 |
| EP | 1569497 A1 | * | 8/2005 | ............ H04R 3/002 |
| JP | 57123797 A | | 8/1982 | |
| JP | 58048597 A | | 3/1983 | |

OTHER PUBLICATIONS

Medrano, Optical position sensors with applications in servo feedback subwoofer control, Feb. 2009.*
Kim et al, The Study on the woofer speaker characteristics due design parameters, Inter noise 2014.*
MTI Instruments, MTI-2100 Fotonic Sensor, pp. 1-6, MTI Instruments, Inc.
Sohlstrom, H., A Fibre Optic Displacement Sensor, Instrumentation Laboratory, The Royal Institute of Technology, 1982, pp. 183-191, 100 44 Stockholm, Sweden.
Berkovic, G. et al., Optical Methods for Distance and Displacement Measurements, Advances in Optics and Photonics, published Sep. 11, 2012, pp. 441-471, vol. 4, issue 4, Israel.

* cited by examiner

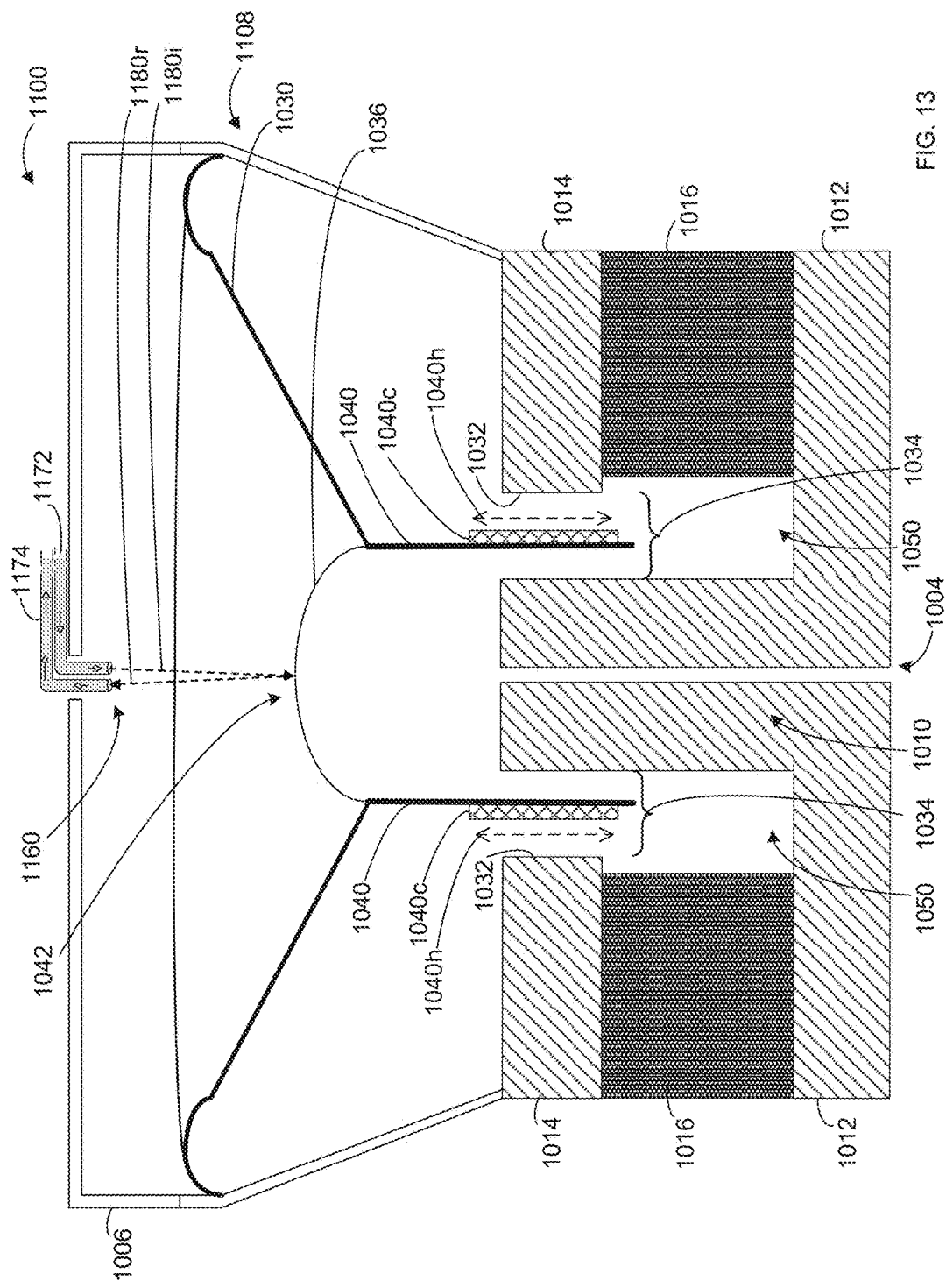

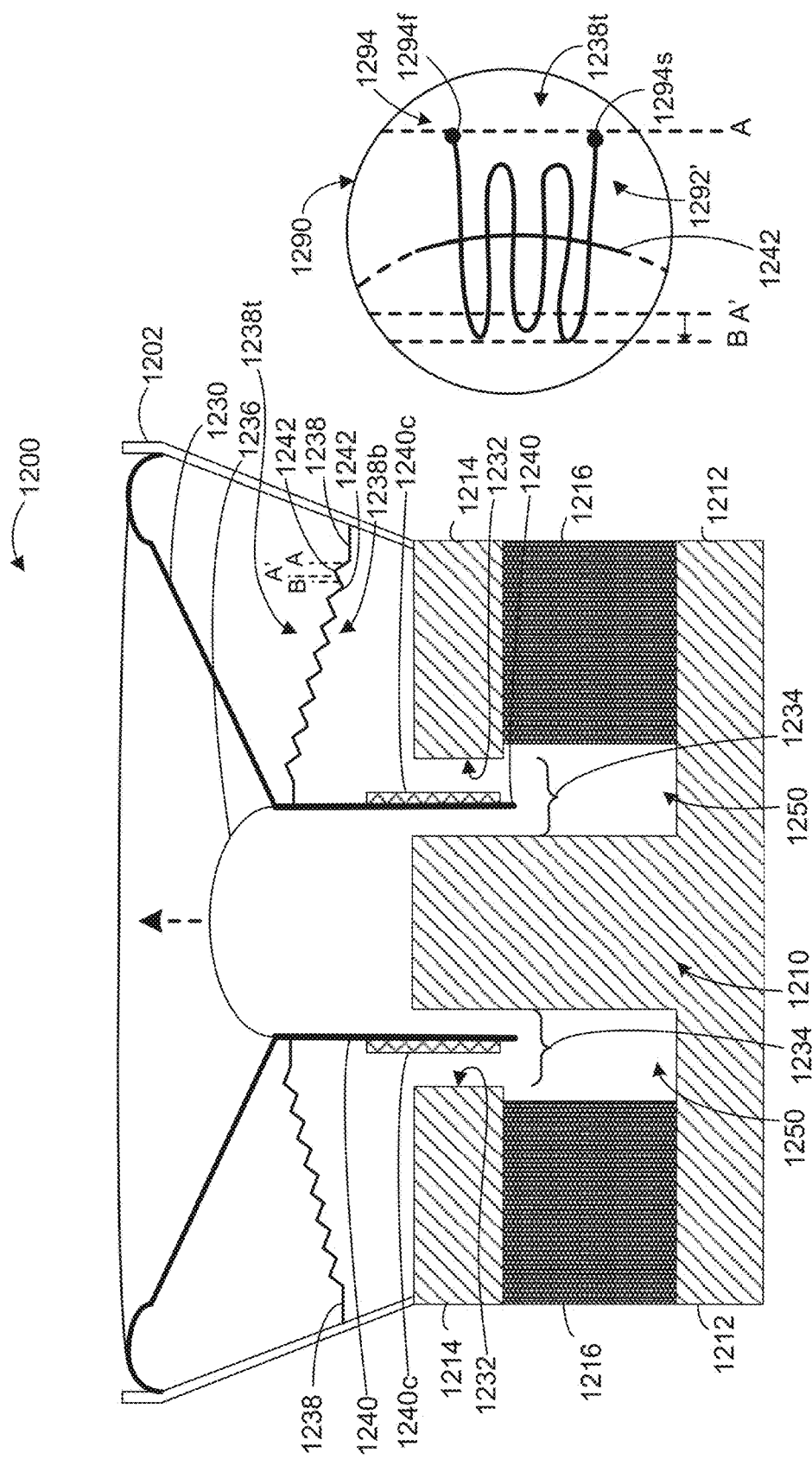

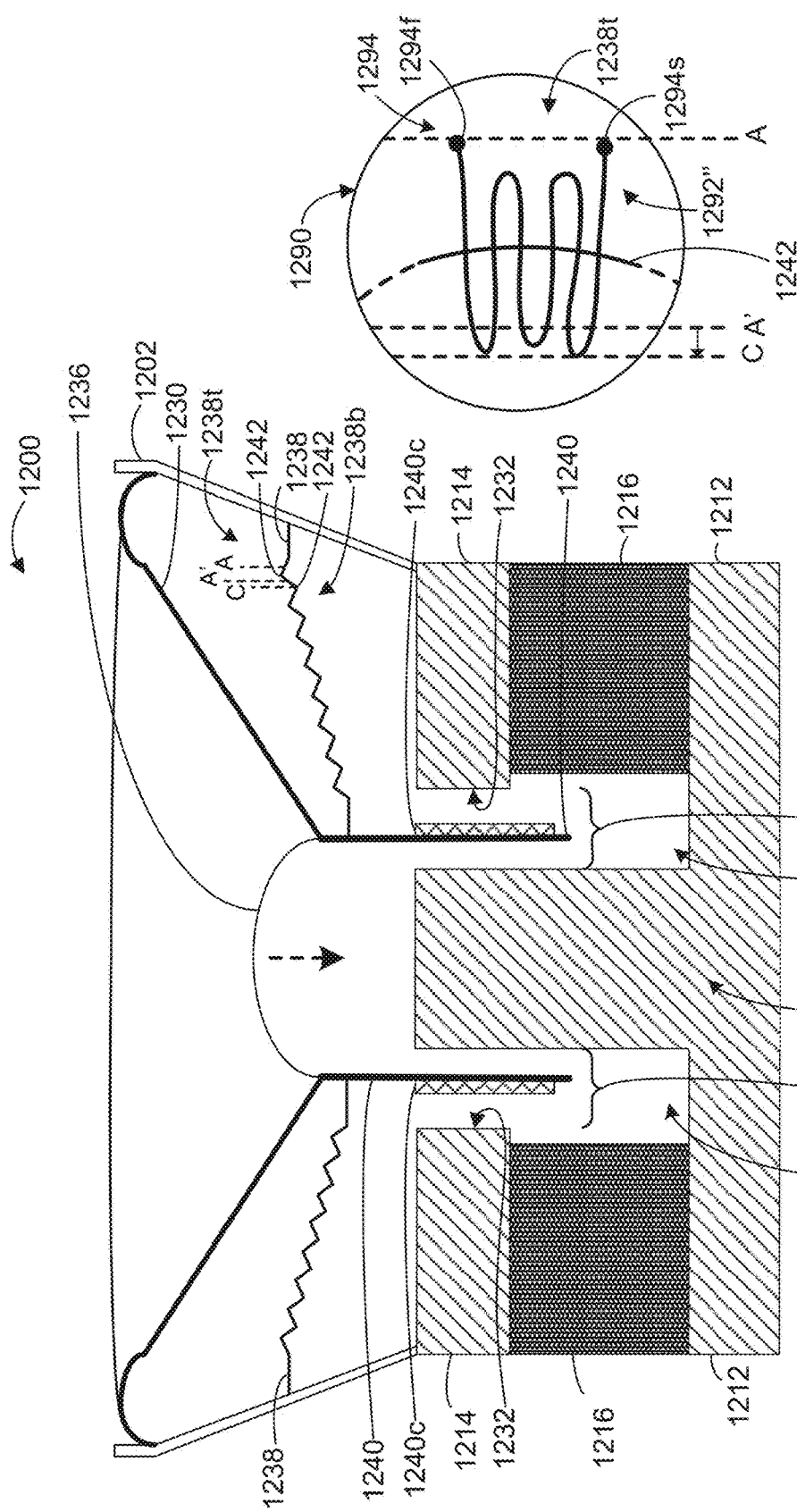

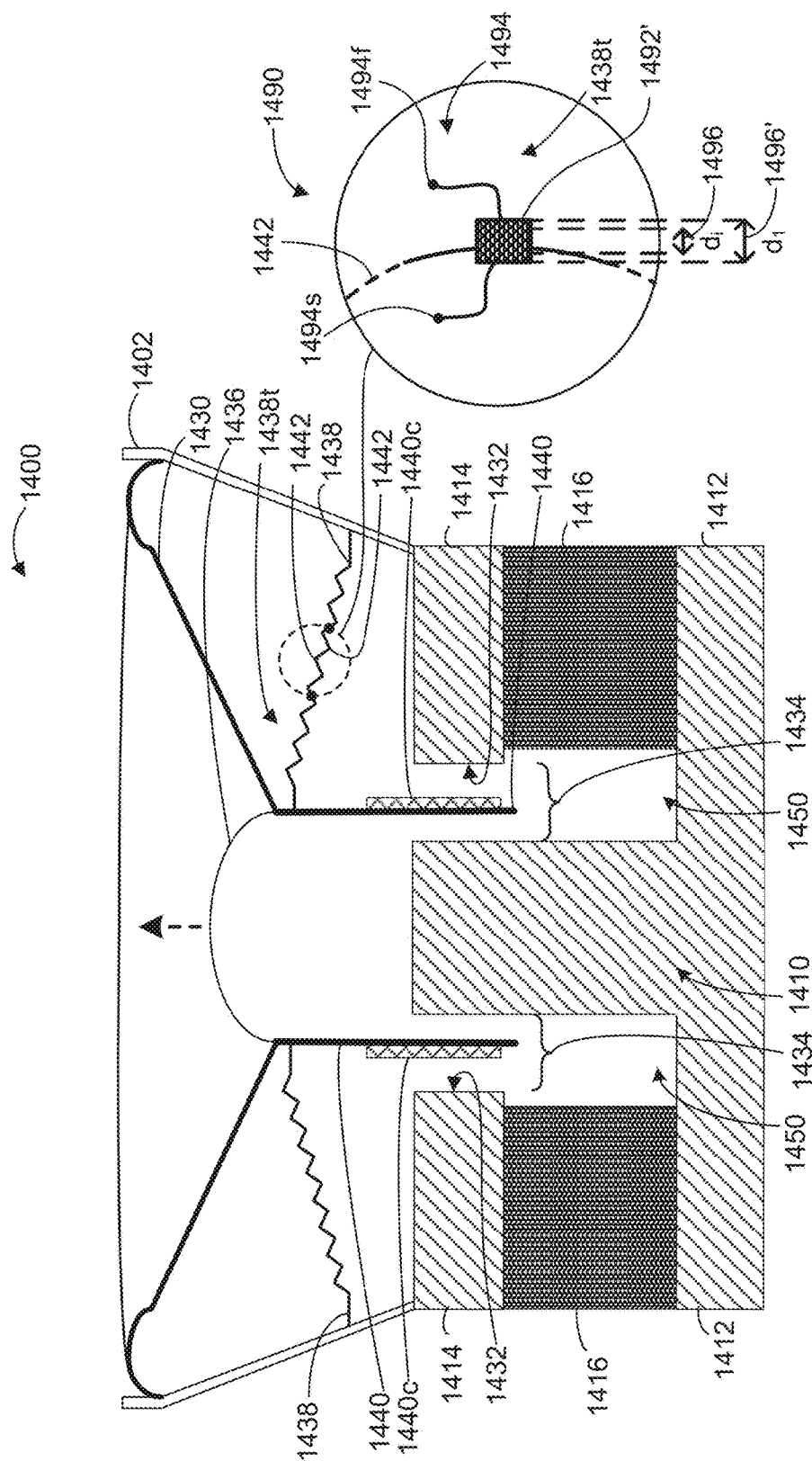

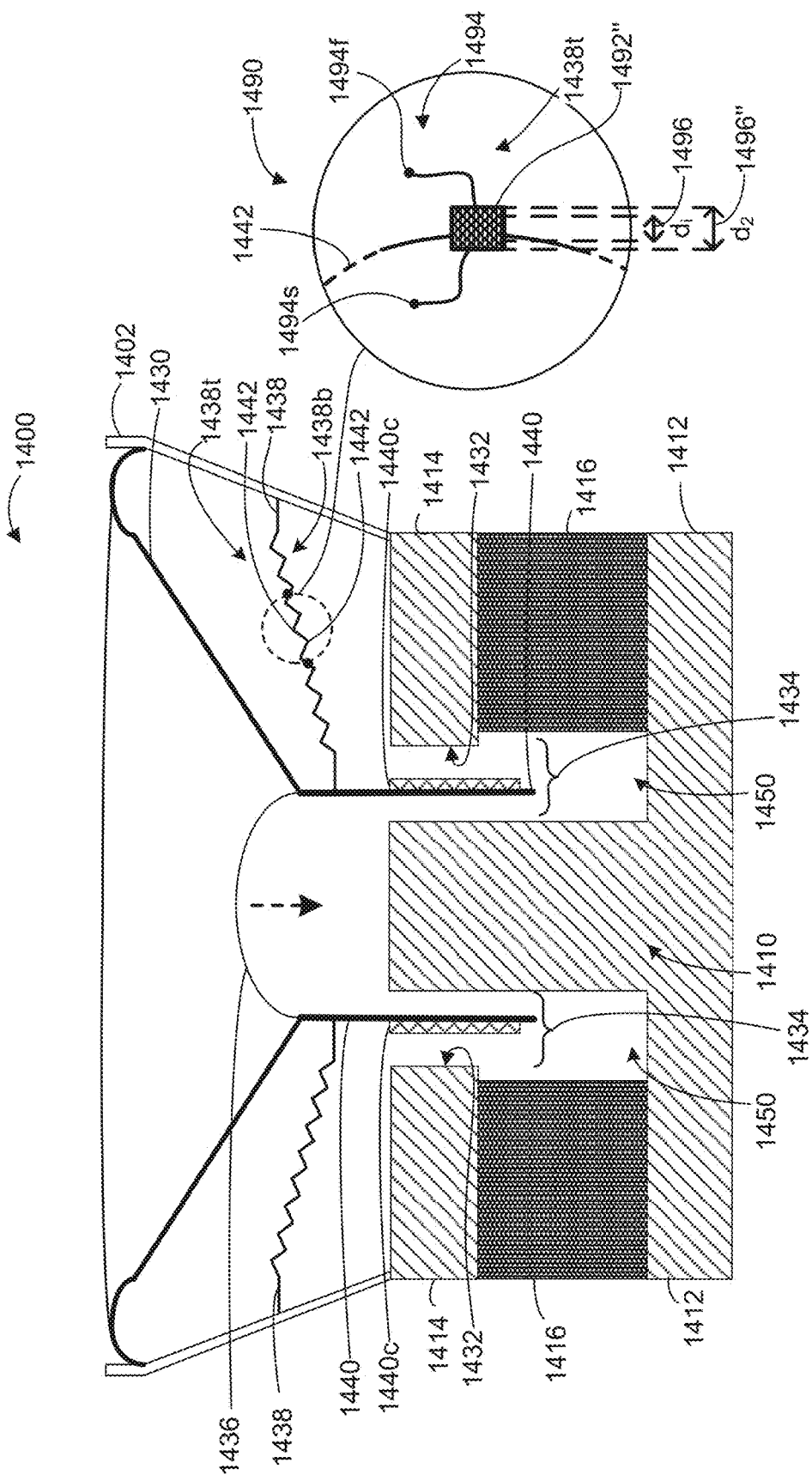

ACOUSTIC TRANSDUCER SYSTEMS WITH POSITION SENSING

The application claims the benefit of U.S. Provisional Application No. 62/145,477, filed on Apr. 9, 2015, and U.S. Provisional Application No. 62/210,672, filed on Aug. 27, 2015. The complete disclosure of each of U.S. Provisional Application No. 62/145,477 and U.S. Provisional Application No. 62/210,672 is incorporated herein by reference.

FIELD

The described embodiments relate to acoustic transducer systems and methods of operating and providing the acoustic transducer systems, and in particular, some of the described embodiments include position sensing.

BACKGROUND

Acoustic transducer systems can operate to convert electrical signals into output acoustic signals. Common acoustic transducer systems include a voice coil that receives the electrical signals from an audio source. The voice coil can be wound around a voice coil structure, such as a voice coil former. The signal at the voice coil can then cause a magnetic flux to be generated by the voice coil in the driver motor of the acoustic transducer system. The diaphragm can then move in response to the force produced by the magnetic flux to generate the output acoustic signal.

The voice coil structure can be coupled with the diaphragm and can be configured to move axially at least partially within an air gap of the acoustic transducer motor. During operation of the acoustic transducer motor, the voice coil structure moves and distortions in the resulting output acoustic signals may be caused by, at least, the movement of the voice coil structure within the air gap.

SUMMARY

The various embodiments described herein generally relate to acoustic transducer systems, and in particular, to acoustic transducer systems involving position sensing, and methods of operating and providing the acoustic transducer systems described herein.

In accordance with some embodiments, there is provided an acoustic transducer system including: a driver motor including: an axial post; a bottom plate extending away from the axial post; a top plate having an interior surface facing the axial post, the top plate and the axial post defining an air gap therebetween; and a magnetic element positioned between the bottom plate and the top plate, the magnetic element being spaced away from the axial post and the magnetic element operable to generate a magnetic flux; a moving assembly comprising: a diaphragm; and a voice coil structure coupled to the diaphragm, the voice coil structure being movable at least partially within the air gap in response to the magnetic flux; a position sensor for generating a position signal representing a displacement of the diaphragm relative to a reference position of the diaphragm, the position sensor including: a light transmitting component for transmitting an incident light towards the moving assembly; and an optical detecting component for receiving a reflected optical signal corresponding to a reflection of the incident light from the moving assembly, the position signal being generated based on the reflected optical signal; and a system controller in electronic communication with the driver motor and the position sensor, the system controller operating to modify an input audio signal from an input terminal based on the position signal received from the position sensor, and to transmit the modified input audio signal to a voice coil coupled to the voice coil structure, the voice coil moving at least partially within the air gap in response to the modified input audio signal.

In some embodiments, the light transmitting component and the optical detecting component are located within the driver motor.

In some embodiments, the light transmitting component and the optical detecting component are located substantially across from an interior surface of the voice coil structure.

In some embodiments, the light transmitting component includes a light transmitter for transmitting the incident light towards the interior surface of the voice coil structure and the optical detecting component includes an optical detector for receiving the reflected optical signal from the interior surface of the voice coil structure.

In some embodiments, the light transmitting component and the optical detecting component are coupled to a top surface of the axial post.

In some embodiments, the position sensor is located within the driver motor and the system controller receives the position signal from the position sensor via a passage defined within one of the axial post and the magnetic element.

In some embodiments, each of the light transmitting component and the optical detecting component includes a set of fiber optic cables, the set of fiber optic cables being provided in a passage defined within one of the axial post and the magnetic element.

In some embodiments, the light transmitting component includes a first fiber optic cable for transmitting the incident light towards the interior surface of the voice coil structure; and the optical detecting component includes a second fiber optic cable for receiving the reflected optical signal from the interior surface.

In some embodiments, at least one fiber optic cable of the set of fiber optic cables includes a fiber optic bundle.

In some embodiments, a probe tip of at least one fiber optic cable of the set of fiber optic cables is coupled with an optical component for one of directing the transmission of the incident light towards the voice coil structure and directing the reflected optical signal towards the position sensor.

In some embodiments, a reflective target region is provided at the voice coil structure for reflecting at least a portion of the incident light variably according to the displacement of the diaphragm. The reflective target region can include a triangular shape.

In some embodiments, the reflective target region includes a first reflective target region for reflecting a first portion of the incident light variably according to the displacement of the diaphragm and a second reflective target region for substantially reflecting a second portion of the incident light, the second portion of the incident light corresponding to a reference signal. The position sensor can generate the position signal based on the reflected optical signal and a reflected reference signal.

In some embodiments, an area of the reflective target region can vary with a height of the voice coil. The reflective target region can be formed onto the voice coil structure with at least one of printing, etching, coating and embedded tape.

In some embodiments, the position sensor is located substantially within a passage defined within one of the axial post and the magnetic element. The light transmitting component can include a light transmitter for transmitting the incident light towards the diaphragm and the optical detecting component can include an optical detector for receiving the reflected optical signal from the diaphragm.

In some embodiments, the light transmitting component includes a first fiber optic cable for transmitting the incident light towards the diaphragm; and the optical detecting component includes a second fiber optic cable for receiving the reflected optical signal from the diaphragm. The reflective target region can be provided at an inner surface of the diaphragm for reflecting the incident light towards the optical detecting component.

In some embodiments, the position sensor is located external to the driver motor, the light transmitting component transmitting the incident light towards an external surface of the diaphragm and the optical detecting component receiving the reflected optical signal from the external surface of the diaphragm.

A sensor support may be provided for mounting the position sensor at the driver, in some embodiments. The position sensor may be mounted to the sensor support, and/or the position sensor may include fiber optic cables that are provided via an aperture defined in the sensor support.

The magnetic element may, in some embodiments, include at least an electromagnet, or a combination of a permanent magnet and an electromagnet. The electromagnet may be a stationary coil.

In some embodiments, the reflected optical signal has an operational wavelength.

In some embodiments, at least one component selected from the group consisting of the light transmitting component and the reflective target region is selected to provide the reflected optical signal having the operational wavelength.

In some embodiments, the reflective target region is colored to provide the reflected optical signal having the operational wavelength.

In some embodiments, the incident light transmitted by the light transmitting component has a modulation and the optical detecting component is sensitive to the modulation.

In some embodiments, one or more filters may be positioned between the light transmitting component and the reflective target region or between the reflective target region and the optical detecting component or both In some embodiments, the operational wavelength includes a range of wavelengths.

In accordance with some embodiments, there is provided an acoustic transducer system including: a driver motor including: an axial post; a bottom plate extending away from the axial post; a top plate having an interior surface facing the axial post, the top plate and the axial post defining an air gap therebetween; and a magnetic element positioned between the bottom plate and the top plate, the magnetic element being spaced away from the axial post and the magnetic element operable to generate a magnetic flux; a moving assembly comprising: a diaphragm; and a voice coil structure coupled to the diaphragm, the voice coil structure being movable at least partially within the air gap in response to the magnetic flux; a position sensor for detecting a displacement of the diaphragm relative to a reference position of the diaphragm, the position sensor can operate to: initiate a transmission of an incident light towards the moving assembly; receive a reflected optical signal corresponding to a reflection of the incident light from the moving assembly; and generate a position signal based on at least the reflected optical signal, the position signal representing the displacement of the diaphragm relative to the reference position of the diaphragm; and a system controller in electronic communication with the driver motor and the position sensor, the system controller operating to modify an input audio signal from an input terminal based on the position signal received from the position sensor, and to transmit the modified input audio signal to a voice coil coupled to the voice coil structure, the voice coil moving at least partially within the air gap in response to the modified input audio signal.

In accordance with some embodiments, there is provided a method of operating any of the acoustic transducer systems described herein.

In accordance with some embodiments, there is provided a method of providing an acoustic transducer system. The method can include: providing a driver motor, the driver motor including: an axial post; a bottom plate extending away from the axial post; a top plate having an interior surface facing the axial post, the top plate and the axial post defining an air gap therebetween; and a magnetic element positioned between the bottom plate and the top plate, the magnetic element being spaced away from the axial post and the magnetic element operable to generate a magnetic flux; mounting a moving assembly to the driver motor, the moving assembly comprising a diaphragm and a voice coil structure mounted to the diaphragm, the voice coil structure being movable at least partially within the air gap in response to the magnetic flux; providing a position sensor for generating a position signal representing a displacement of the diaphragm relative to a reference position of the diaphragm, the position sensor including: a light transmitting component for transmitting an incident light towards the moving assembly; and an optical detecting component for receiving a reflected optical signal corresponding to a reflection of the incident light from the moving assembly, the position signal being generated based on the reflected optical signal; and providing a system controller in electronic communication with the driver motor and the position sensor, the system controller operable to modify an input audio signal from an input terminal based on the position signal received from the position sensor, and to transmit the modified input audio signal to a voice coil coupled to the voice coil structure.

In some embodiments, the methods described herein include defining a passage through one of the axial post and the magnetic element, the passage usable by the position sensor for at least one of transmitting the incident light towards one of the voice coil structure and the diaphragm and receiving the reflected optical signal.

In some embodiments, providing the position sensor includes mounting the light transmitting component and the optical detecting component within the driver motor.

In some embodiments, the methods described herein include mounting the light transmitting component and the optical detecting component substantially across from an interior surface of the voice coil structure.

In some embodiments, the methods described herein include mounting the light transmitting component and the optical detecting component to a top surface of the axial post.

In some embodiments, providing the position sensor includes providing a set of fiber optic cables through the passage. Providing the set of fiber optic cables can include: providing a first fiber optic cable as the light transmitting component for transmitting the incident light towards the voice coil structure and providing a second fiber optic cable as the optical detecting component for receiving the reflected optical signal from the voice coil structure. In some embodiments, providing the set of fiber optic cables can include providing at least one fiber optic bundle. In some embodiments, providing the set of fiber optic cables includes mounting an optical component to a probe tip of at least one fiber optic cable of the set of fiber optic cables, the optical component operable to direct at least one of the transmission of the incident light towards the voice coil structure and the reflected optical signal towards the position sensor.

In some embodiments, the methods described herein include providing a reflective target region at the voice coil structure, the reflective target region reflecting at least a portion of the incident light variably according to the displacement of the diaphragm.

In some embodiments, providing the reflective target region at the voice coil structure includes varying an area of the reflective target region according to a corresponding height of the voice coil structure.

In some embodiments, providing the reflective target region at the voice coil structure includes: defining a first reflective target region of the reflective target region for reflecting a first portion of the incident light variably according to the displacement of the diaphragm; and defining a second reflective target region of the reflective target region for substantially reflecting a second portion of the incident light, the second portion of the incident light corresponding to a reference signal.

In some embodiments, providing the reflective target region at the voice coil structure includes at least one of printing, etching, coating and embedded tape.

In some embodiments, the methods described herein include mounting the position sensor substantially within the passage defined within the one of the axial post and the magnetic element. Mounting the position sensor substantially within the passage can, in some embodiments, include: mounting a first fiber optic cable as the light transmitting component for transmitting the incident light towards the diaphragm;

and mounting a second fiber optic cable as the optical detecting component for receiving the reflected optical signal from the diaphragm.

In some embodiments, the methods described herein include providing a reflective target region at an inner surface of the diaphragm for reflecting the incident light towards the optical detecting component.

The optical component can include at least one of a prism, a lens and/or a mirror.

In some embodiments, the voice coil structure moves axially at least partially within the air gap in response to the magnetic flux.

In some embodiments, the reflected optical signal has an operational wavelength.

In some embodiments, the method further comprises selecting at least one component from the group consisting of the light transmitting component and the reflective target region to provide the reflected optical signal having the operational wavelength.

In some embodiments, the method further comprises providing the reflective target region with a color to provide the reflected optical signal having the operational wavelength.

In some embodiments, the method further comprises modulating the incident light transmitted by the light transmitting component and wherein the optical detecting component is sensitive to the modulation.

In some embodiments, the method further comprises positioning one or more filters between the light transmitting component and the reflective target region or between the reflective target region and the optical detecting component or both.

In some embodiments, the operational wavelength includes a range of wavelengths.

In accordance with some embodiments, there is provided an acoustic transducer system including: a driver motor including: an axial post; a bottom plate extending away from the axial post; a top plate having an interior surface facing the axial post, the top plate and the axial post defining an air gap therebetween; and a magnetic element positioned between the bottom plate and the top plate, the magnetic element being spaced away from the axial post and the magnetic element operable to generate a magnetic flux; a moving assembly comprising: a diaphragm; a voice coil structure coupled to the diaphragm, the voice coil structure being movable at least partially within the air gap in response to the magnetic flux; and a spider operably coupled to the voice coil structure, the spider being movable with the voice coil structure; a position sensor coupled to the spider for generating a position signal representing a displacement of the diaphragm relative to a reference position of the diaphragm, the position sensor being associated with electrical characteristics that are variable according to the displacement of the diaphragm and the position sensor being operable to generate the position signal based on the electrical characteristics of the position sensor; and a system controller in electronic communication with the driver motor and the position sensor, the system controller operating to modify an input audio signal from an input terminal based on the position signal received from the position sensor, and to transmit the modified input audio signal to a voice coil coupled to the voice coil structure, the voice coil moving at least partially within the air gap in response to the modified input audio signal.

In some embodiments, the position sensor comprises at least one of (i) at least one strain gauge sensor and (ii) at least one piezoelectric sensor.

In some embodiments, the position sensor comprises two or more sensors, the two or more sensors being spaced apart radially along the spider.

In some embodiments, the two or more sensors comprises one of (i) two or more strain gauge sensors and (ii) two or more piezoelectric sensors.

In some embodiments, the position sensor comprises at least one strain gauge sensor, and the at least one strain gauge sensor is printed onto a portion of the spider.

In accordance with some embodiments, there is provided a method of providing an acoustic transducer system, the method comprises: providing a driver motor, the driver motor comprising: an axial post; a bottom plate extending away from the axial post; a top plate having an interior surface facing the axial post, the top plate and the axial post defining an air gap therebetween; and a magnetic element positioned between the bottom plate and the top plate, the magnetic element being spaced away from the axial post and the magnetic element operable to generate a magnetic flux; mounting a moving assembly to the driver motor, the moving assembly comprising: a diaphragm; a voice coil structure mounted to the diaphragm, the voice coil structure being movable at least partially within the air gap in response to the magnetic flux; and a spider operably mounted to the voice coil structure, the spider being movable with the voice coil structure; providing a position sensor at the spider for generating a position signal representing a displacement of the diaphragm relative to a reference position of the diaphragm, the position sensor being associated with electrical characteristics that are variable according to the displacement of the diaphragm and the position sensor being operable to generate the position signal based on the electrical characteristics of the position sensor; and providing a system controller in electronic communication with the driver motor and the position sensor, the system controller operable to modify an input audio signal from an input terminal based on the position signal received from the position sensor, and to transmit the modified input audio signal to a voice coil coupled to the voice coil structure.

In some embodiments, the position sensor comprises at least one of (i) at least one strain gauge sensor and (ii) at least one piezoelectric sensor.

In some embodiments, the position sensor comprises two or more sensors, the two or more sensors being spaced apart radially along the spider.

In some embodiments, the two or more sensors comprises one of (i) two or more strain gauge sensors and (ii) two or more piezoelectric sensors.

In some embodiments, the position sensor comprises at least one strain gauge sensor, and the at least one strain gauge sensor is printed onto the spider.

BRIEF DESCRIPTION OF THE DRAWINGS

Several embodiments will now be described in detail with reference to the drawings, in which:

FIG. 13 is a cross-sectional view of another example driver operable in the acoustic transducer systems described herein;

FIG. 15A shows the driver in FIG. 14A at a first operating state;

FIG. 15B shows the portion of the spider in FIG. 14B at the first operating state;

FIG. 16A shows the driver in FIG. 14A at a second operating state;

FIG. 16B shows the portion of the spider in FIG. 14B at the second operating state;

FIG. 19A shows the driver in FIG. 18A at a first operating state;

FIG. 19B shows the portion of the spider in FIG. 18B at the first operating state;

FIG. 20A shows the driver in FIG. 18A at a second operating state; and

FIG. 20B shows the portion of the spider in FIG. 18B at the second operating state.

Figure 1:
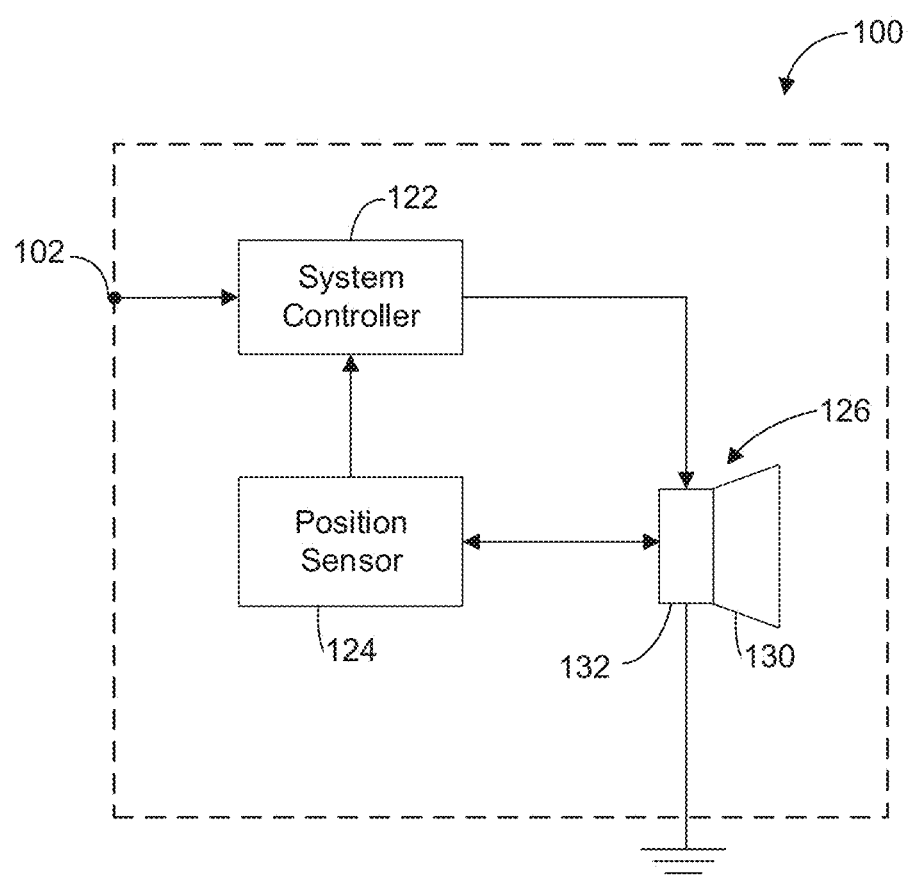
FIG. 1 is a block diagram of an acoustic transducer system in accordance with an example embodiment.

The drawings, described below, are provided for purposes of illustration, and not of limitation, of the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXAMPLE EMBODIMENTS

It will be appreciated that numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that the term "coupled" used herein indicates that two elements can be directly coupled to one another or coupled to one another through one or more intermediate elements. The term "coupled" can, in some embodiments, also indicate that the two elements are integrally formed.

Reference is first made to FIG. 1, which illustrates an example acoustic transducer system 100. The acoustic transducer system 100 includes, at least, a system controller 122, a position sensor 124 and a driver, or acoustic transducer, 126. The driver 126, as shown, includes a diaphragm 130 operably coupled to a driver motor 132.

The position sensor 124 can be in electronic communication with the system controller 122 and the driver 126. As will be described with reference to FIGS. 2 to 4, 6, and 8 to 20, the position sensor 124 can be coupled to the driver 126 in various ways.

Generally, the position sensor 124 can operate to detect a displacement of the diaphragm 130 during the operation of the acoustic transducer system 100 relative to a reference position of the diaphragm 130.

When the diaphragm 130 is stationary, that is, when no current is flowing through a voice coil in the driver 126, the diaphragm 130 is at a reference position. The location of the diaphragm 130 relative to the driver motor 132 can vary for different designs of the driver 126 and therefore, the reference position of the diaphragm 130 can vary for different designs of the driver 126. When the diaphragm 130 is in motion, the diaphragm 130 can move relative to the driver motor 132 and the displacement of the diaphragm 130 can correspond to a position of the diaphragm 130 relative to the reference position. As the diaphragm 130 moves, the voice coil structure operably coupled to the diaphragm 130 also moves with the diaphragm 130.

In some embodiments involving optical positioning sensing, to detect the displacement of the diaphragm 130, the position sensor 124 can initiate a transmission of an incident light towards a voice coil structure within the driver 126 or towards the diaphragm 130. The incident light may, in some embodiments, be a modulated incident signal. The modulated incident signal can be transmitted instead of the incident light when there is a risk of ambient light affecting the transmission of the incident light.

The position sensor 124 can then receive a reflected optical signal corresponding to a reflection of the incident light from the voice coil structure or the diaphragm. Due to a predetermined level of reflectivity at the voice coil structure or the diaphragm 130 and/or losses during the transmission of the incident light and/or the reflected optical signal, the reflected optical signal will be associated with an intensity level that is less than an intensity level of the incident light. As will be described, in some embodiments, the intensity level of the reflected optical signal may be controlled to correspond to the displacement of the diaphragm 130.

Based on the reflected optical signal, the position sensor 124 can then generate an electronic position signal to represent the displacement of the diaphragm 130 during operation of the acoustic transducer system 100. In some embodiments, the position sensor 124 may generate the position signal by comparing an intensity level of the reflected optical signal with an intensity level of the incident light and/or an intensity level corresponding to the reference position of the diaphragm.

In some embodiments, the generation of the position signal can involve further processing of the reflected optical signal. For example, the position sensor 124 can calibrate the reflected optical signal with the following equation:

$$x' = \left(k_{slope} \times \frac{x}{f(x)}\right) + k_{os}$$

where x corresponds to a magnitude of the reflected optical signal (which can be an approximation of the displacement of the diaphragm 130 relative to the reference position), x' corresponds to a processed reflected optical signal, f(x) can be any mathematical function defining a desired relationship between x and x', $k_{slope}$ corresponds to a calibration scalar factor and $k_{os}$ corresponds to a calibration offset factor. The mathematical function, f(x), can, in some embodiments, be applied to calibrate the relationship between x and x'. In some embodiments, the mathematical function, f(x), can also include correction factors for compensating non-linearities at the driver motor 132.

In some embodiments, a portion of the position sensor 124 can be provided within the driver 126 while another portion of the position sensor 124 can be located outside the driver 126. The portion of the position sensor 124 located outside the driver 126 can be referred to as the external portion. For example, the position sensor 124 can include an optical sensor positioned within the driver 126. The position sensor 124 can initiate the optical sensor to transmit the incident light towards the voice coil structure or the diaphragm 130, and to transmit the reflected optical signal from the voice coil structure or the diaphragm 130 towards the external portion of the position sensor 124. The external portion of the position sensor 124 can be connected to the optical sensor via a passage defined in the driver 126. In some other embodiments, the position sensor 124 can include a set of fiber optic cables that is fed through the passage defined in the driver 126. The set of fiber optic cables are connected to the external portion of the position sensor 124 for transmitting the incident light towards the voice coil structure or the diaphragm 130, and receiving a reflection of the incident light (e.g., the reflected optical signal) towards the external portion of the position sensor 124.

As shown in FIG. 1, the system controller 122 can be in electronic communication with the driver 126 and the position sensor 124. It will be understood that the system controller 122 may be implemented in software or hardware, or a combination thereof. The hardware may be digital and/or analog.

The system controller 122 can receive an input audio signal from an input terminal 102. The input terminal 102 can be coupled to an audio source (not shown) for providing the input audio signal to the system controller 122. The input audio signal may be a one volt peak-to-peak signal with a time varying magnitude and a time-varying frequency. In some embodiments, the input audio signal may be any other type of audio signal, such as an analog audio signal, a digital pulse-width modulated audio signal and other similar audio signals.

Based on the position signal received from the position sensor 124, the system controller 122 can then modify the input audio signal received from the input terminal 102 to generate a modified input audio signal. The position signal can, in some embodiments, act as a control system input. For example, the system controller 122 can modify the input audio signal based on the position signal as part of a servomechanism and/or protection mechanism. The position signal can also be used by the system controller 122 to control and/or compensate for, at least, distortions associated with the movement of the voice coil structure. The system controller 122 can then transmit the modified input audio signal to the voice coil in the driver 126 so that the movement of the voice coil structure can be in response to the modified input audio signal.

Example embodiments of the driver motor 132 will now be described with reference to, at least, FIGS. 2 to 4, 6, and 8 to 20.

Figure 2:
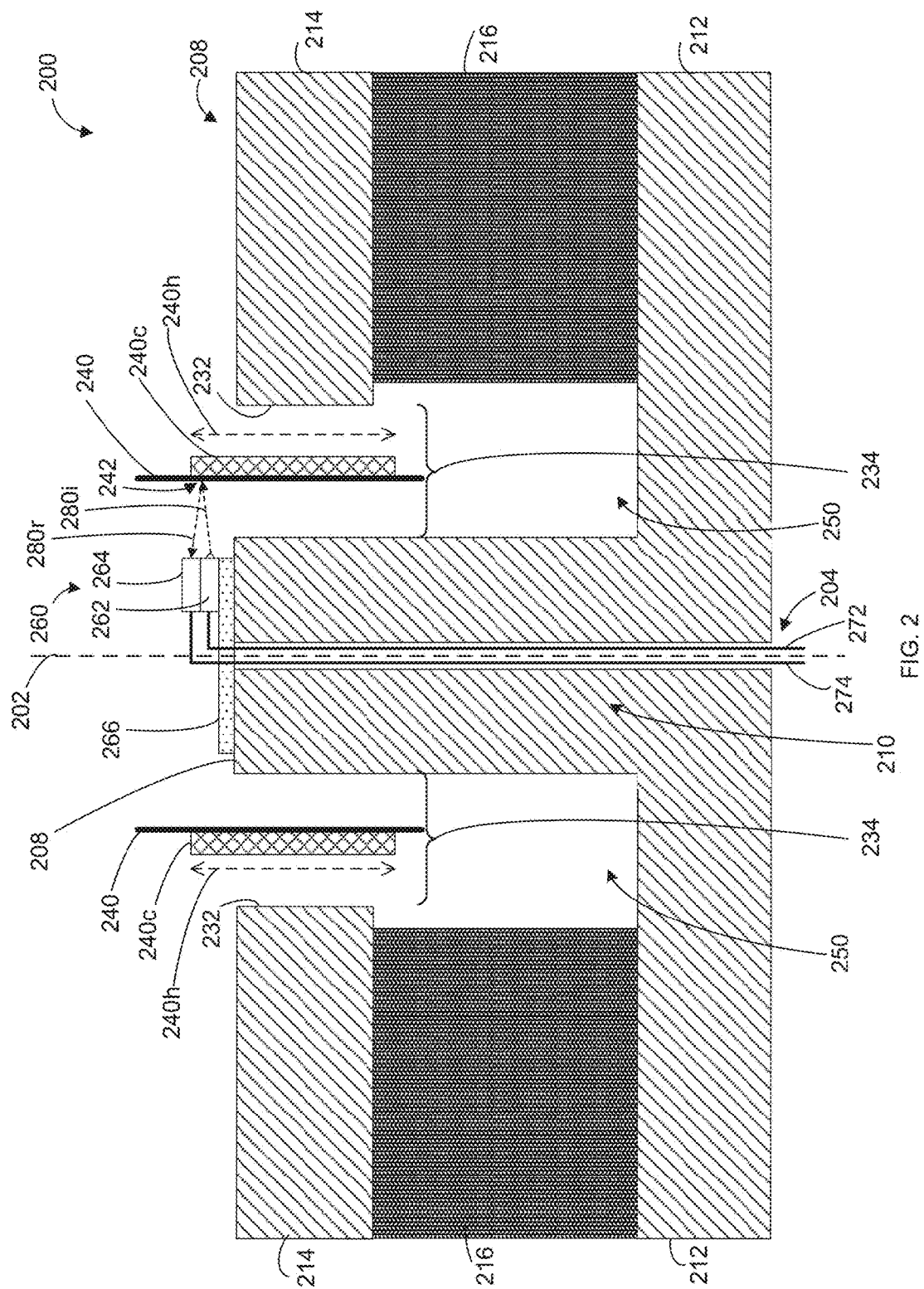
FIG. 2 is a cross-sectional view of an example driver motor operable in the acoustic transducer systems described herein.

FIG. 2 is a cross-sectional view of an example driver motor 200. A center axis 202 is shown in FIG. 2 for illustrative purposes.

The driver motor 200 includes, at least, an axial post 210, a bottom plate 212 extending away from the axial post 210, and a top plate 214 with an interior surface 232 facing the axial post 210. In the embodiment shown in FIG. 2, the axial post 210 can be referred to as a center post since the axial post 210 is positioned at a substantially central region of the driver motor 200. A magnetic element 216 can be positioned between the bottom plate 212 and the top plate 214 so that the magnetic element 216 is positioned within the path of the magnetic flux circuit or loop.

As shown in FIG. 2, a passage 204 is defined in the axial post 210. The passage 204 can provide ventilation for the driver motor 200. The passage 204 may, in some of the described embodiments, facilitate transmission of light, optical signals, and/or electronic signals between the position sensor 124 and the voice coil structure 240 or the diaphragm 130 (not shown in FIG. 2).

In some other embodiments, the axial post 210 may form an outer wall of the driver motor 200 while the central region of the driver motor 200 is formed with, at least, the top plate 214, the bottom plate 212 and the magnetic element 216. The passage 204 can be formed in the top plate 214, the bottom plate 212 and the magnetic element 216 in these embodiments.

The magnetic element 216 may be formed from one or more hard magnetic materials, such as, but not limited to, ferrite, neodymium-iron-boron, and Samarium-cobalt. Each of the center post 210, the bottom plate 212 and the top plate 214 may generally be manufactured from any suitably magnetically permeable materials, such as low carbon steel. In some embodiments, the magnetic element 216 can be provided as an electromagnet, or a combination of a permanent magnet and one or more electromagnets, so that the magnetization of a body of the driver motor 200 can be in response to a signal provided to a coil coupled to a body 208 of the driver motor 200. An example embodiment of the acoustic transducer systems described herein involving at least an electromagnet will be described with reference to FIG. 4.

The top plate 214 and the center post 210 also define an air gap 234 therebetween. A voice coil structure 240 operably coupled to the diaphragm 130 (not shown in FIG. 2) can move at least partially within the air gap 234 axially with respect to the center post 210. The voice coil 240c wound around the voice coil structure 240 can have a coil height 240h. The voice coil structure 240 and the diaphragm 130 can, together, be referred to as a moving assembly.

In the embodiment of FIG. 2, the voice coil 240c is shown as a single coil. In some embodiments, the voice coil 240c can be provided as one or more coils that are coupled to the voice coil structure 240 and also magnetically coupled to one another, but separate coils.

The voice coil structure 240 can move axially, at least, in response to the magnetic flux generated by the magnetic element 216 and the magnetic flux generated by the current in the voice coil 240c. The axial movement of the voice coil structure 240 can be controlled by the modified input audio signal received from the system controller 122.

As shown in FIG. 2, the magnetic element 216 can be spaced away from the center post 210 so that a driver cavity 250 can be provided. During movement of the diaphragm 130, the voice coil structure 240 can at least partially move into and out of the driver cavity 250. The driver cavity 250 can be configured to accommodate the movement of the voice coil structure 240.

The driver 126 can be configured to accommodate the overall movement of the voice coil structure 240. As described, in response to the magnetic flux generated by the magnetic element 216 and the current in the voice coil 240c, the voice coil structure 240 will move axially towards and away from the bottom plate 212. The movement of the voice coil structure 240 can generally be limited to a displacement range that includes the voice coil structure 240 at least partially and/or, in some embodiments, completely moving above and below the air gap 234. The diaphragm 130 and the driver cavity 250, therefore, can be configured to accommodate the displacement range. The displacement range can, in some embodiments, correspond to substantially the coil height 240h from each end of the air gap 234.

The driver motor 200 also includes an optical sensor 260, as shown in FIG. 2. The optical sensor 260 includes a light transmitting component, such as a light transmitter 262, for transmitting the incident light 280i towards the voice coil structure 240 and an optical detecting component, such as an optical detector 264, for receiving the reflected optical signal 280r resulting from the transmission of the incident light 280i towards the voice coil structure 240. In some other embodiments, the functionalities of the light transmitter 262 and the optical detector 264 can be provided by one integrated component operable to provide the incident light 280i and to receive the reflected optical signal 280r instead of separate components as shown in FIG. 2.

The light transmitter 262 may include one or more optoelectronic sources such as various light sources (e.g., light-emitting diodes (LEDs)). The optical detector 264 may include one or more optoelectronic devices, such as photodiodes.

The operation of the various components of the driver motor 200, as well as optoelectronic devices such as the LEDs and photodiodes themselves, can be sensitive to temperature changes. Optionally, thermal compensation mechanisms can be included within the driver motor 200 and/or at the position sensor 124 to address performance variations that may result from temperature changes within the driver motor 200 and/or at the position sensor 124.

The optical sensor 260 can be positioned relative to the voice coil structure 240 to facilitate the transmission of the light and/or optical signals between the optical sensor 260 and the voice coil structure 240 and reflection of light and/or optical signals from the voice coil structure 240 to the optical sensor 260. Also, the optical sensor 260 can be coupled to a top surface 208 of the axial post 210. In the example shown in FIG. 2, the optical sensor 260 is coupled to the top surface 208 using a circuit board 266 mounted to the top surface 208. In some embodiments, the optical sensor 260 can be coupled to the axial post 210 with an adhesive material, such as epoxy or other similar materials.

The optical sensor 260 and the external portion of the position sensor 124 can be coupled via connections 272, 274 that are fed through the passage 204, as shown in FIG. 2.

The position sensor 124, as a whole, may, in some embodiments, be located within the driver motor 200, such as on the circuit board 266. When the position sensor 124 is provided within the driver motor 200, the position sensor 124 can be coupled to the system controller 122 via connections that are fed through the passage 204.

With the embodiment shown in FIG. 2, the distance between the optical sensor 260 and the voice coil structure 240 is substantially fixed. As a result, the displacement of the diaphragm 130 can be determined based on the reflected optical signal 280r. In some embodiments, the position sensor 124 can determine the displacement of the diaphragm 130 by comparing the reflected optical signal 280r with a sample of the incident signal corresponding a fixed proportion of the incident light signal.

Referring still to FIG. 2, a reflective target region 242 can be provided on the voice coil structure 240 so that when the incident light 280i reaches the voice coil structure 240, the resulting reflected optical signal 280r an intensity that corresponds to the axial displacement of the diaphragm 130 relative to the reference position. For example, the intensity level of the operational wavelength can correspond to the axial displacement of the diaphragm 130. Example reflective target regions 242a and 242b are shown in respective FIGS. 5A and 5B.

Optionally, the incident light 280i or the reflective target region 242 or both may be selected such that the reflected optical signal 280r has an operational wavelength. The operational wavelength may correspond to a wavelength preferentially sensed by optical detector 264.

For example, the incident light 280i transmitted by the light transmitter 262 may have a wavelength corresponding to the operational wavelength. In other embodiments, the reflective target region 242 may be colored to provide a reflected optical signal having the operational wavelength. In other embodiments, the incident light 280i may be reflected by the reflective target region 242 to produce a reflected optical signal 280r of a specific color corresponding to a selected operational wavelength. In some embodiments, an optical filter corresponding to the operation wavelength may be positioned in the light path between the light transmitter 262 and the reflective target region 242 or between the reflective target region 242 and the optical detector 264 so that the reflected optical signal 280r reaching the optical detector 264 is filtered to select the operational wavelength.

In some embodiments, the operational wavelength may include a range of wavelengths to which the optical detector is sensitive. The light transmitter, reflective target region, the optical sensor, or light filters if they are provided, or a combination of them, may be selected to produce a reflected optical signal having a corresponding range of wavelengths.

In some embodiments, the optical detector may be sensitive to light having a selected modulation pattern. The light transmitter 262 may be adapted to transmit the incident light 280i with the modulation pattern. FIG. 5A is a partial view of an interior surface of a voice coil structure 240 in accordance with an example embodiment. The reflective target region 242a is formed so that its width varies with the coil height 240h. For example, the reflective target region 242a is relatively narrower in the upper region of the voice coil structure 240 generally shown at 240u and is relatively wider in the lower region of the voice coil structure 240 generally shown at 240l. When the diaphragm 130 is axially displaced, the area of the portion of the reflective target region 242a from which the reflected optical signal 280r is reflected will vary. As a result, the intensity level of the reflected optical signal 280r will vary. Although the reflective target region 242a in this embodiment is provided as a triangular shape, other embodiments may involve different shapes that can also vary the intensity of the reflected optical signal 280r according to the displacement of the diaphragm 130 relative to the reference position. As above, optical detector may be preferentially sensitive to light having a selected operational wavelength. The light transmitter, reflective target region, the optical sensor, or light filters if they are provided, or a combination of them, may be selected to produce a reflected optical signal having the operational wavelength.

The reflective target region 242a can be formed on the interior surface of the voice coil structure 240 in different ways, such as by printing, painting, etching, dry transfer, selective coating, or, embedded with tape onto the interior surface of the voice coil structure 240.

Also, the voice coil structure 240 can be formed of aluminum, which is associated with a high level of reflectivity. The dynamic range of the intensity level of the reflected optical signal 280r can be increased with the use of aluminum for the voice coil structure 240.

Figure 5B:
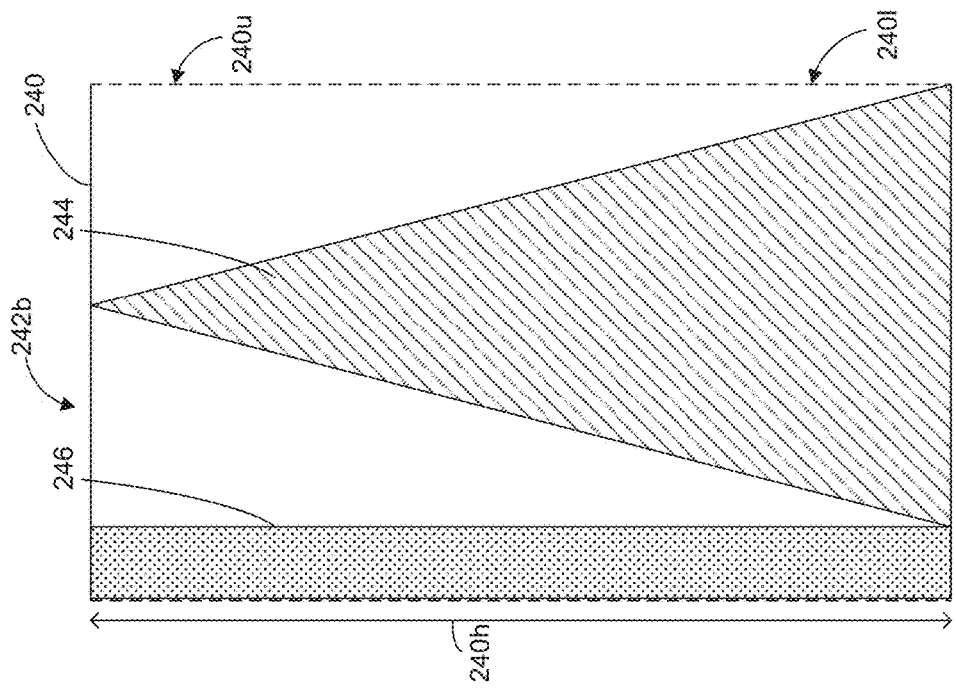
FIGS. 5A and 5B are partial views of respective example interiors of a voice coil structure in accordance with example embodiments.
Figure 5A:
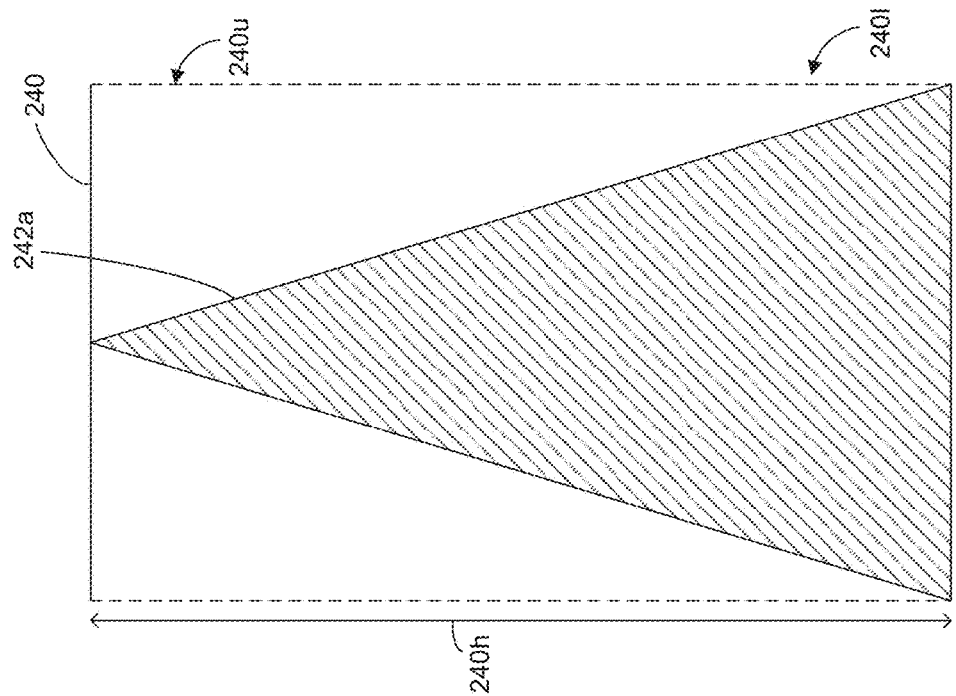

FIG. 5B is a partial view of another example interior surface of the voice coil structure 240. Unlike the reflective target region 242a in FIG. 5A, the reflective target region 242b in FIG. 5B includes a first reflective target region 244 for reflecting a first portion of the incident light 280i variably according to the displacement of the diaphragm, and a second reflective target region 246 for substantially reflecting a second portion of the incident light 280i. It will be understood that the geometry of the first and second reflective target regions 244 and 246 are only examples, and that other geometries can similarly be used.

The second portion of the incident light 280i, which can be referred to as a reference signal, is a sample of the incident light 280i and can correspond to a constant percentage of the incident light 280i. The intensity level of the reference signal is substantially independent of the displacement of the diaphragm 130. That is, the second reflective target region 246, unlike the first reflective target region 244, can substantially reflect the incident light 280i with minimal reduction of the intensity level.

The reference signal can then be used to compensate for undesired effects to the incident light and reflected optical signals within the position sensor 124 and/or the driver motor 200. Since the reference signal and the reflected reference signal travel in the same path as the respective incident light and the reflected optical signal, the reference signal and the reflected reference signal can be characterized by the undesired effects and/or losses associated with the passage of the incident light and reflected optical signal. When the position sensor 124 receives the reflected reference signal, the position sensor 124 can compare the reflected reference signal with the reflected optical signal to determine the error signal, or the portions of the reflected optical signal due to undesired environmental effects, such as changing ambient temperature, aging of the electronic components and/or transmission in the optical connections. For example, the position sensor 124 can subtract the reflected reference signal from the reflected optical signal to determine the error signal and adjust the position signal based on the error signal.

Figure 3:
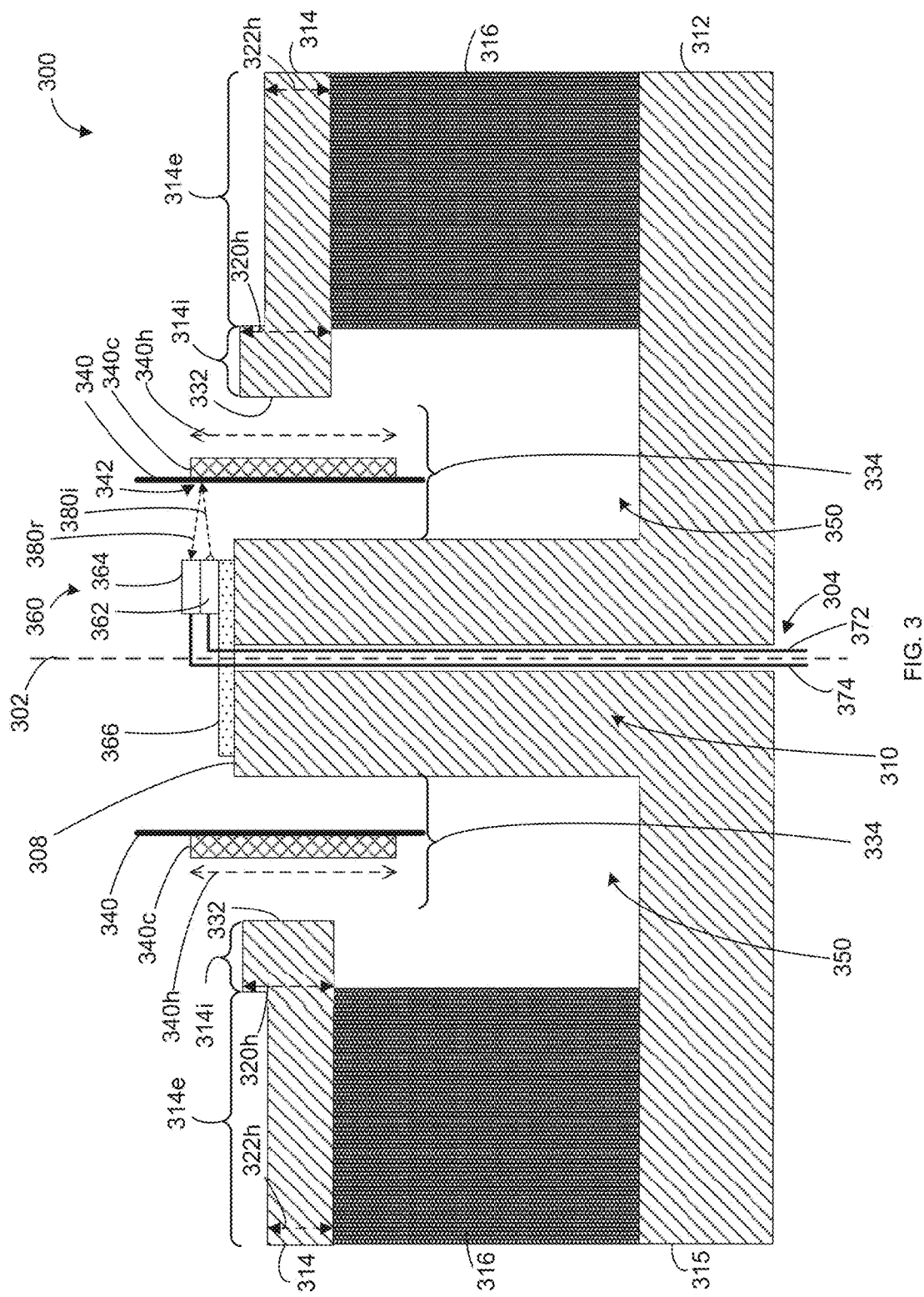
FIG. 3 is a cross-sectional view of another example driver motor operable in the acoustic transducer systems described herein.

Reference will now be made to FIG. 3. FIG. 3 is a cross-sectional view of an example driver motor 300 that is operable in the acoustic transducer systems described herein. A center axis 302 is shown in FIG. 3 for illustrative purposes. Similar to the driver motor 200 in FIG. 2, the driver motor includes an axial post 310, a bottom plate 312 extending away from the axial post 310, and a top plate 314 with an interior surface 332 facing the axial post 310.

In some embodiments, the top plate 214, the bottom plate 212 and/or the center post 210 of the driver motor 200 may be modified in order to increase the linearity of the output acoustic signal, reduce mass or for another purpose without substantially affecting the overall performance of the acoustic transducer systems 100 described herein. For example, as shown in FIG. 3, the geometry of the top plate 214 may be modified to reduce unnecessary use of steel. Unlike the top plate 214 in FIG. 2, the top plate 314 includes an interior portion 314$i$ with a height 320$h$ and an exterior portion 314$e$ with a height 322$h$ that is shorter than the height 320$h$. The height 320$h$ of the interior portion 314$i$ can be higher than the height 322$h$ of the exterior portion 314$e$ so that the amount of steel can be reduced without reducing a height of an air gap defined between the top plate 314 and the axial post 310. The interior portion 314$i$ can be formed integrally with the exterior portion 314$e$, in some embodiments.

The size of each of the interior portion 314$i$ and the exterior portion 314$e$ with respect to the overall top plate 314 is illustrated as being only an example and should not be construed as a limitation. The interior portion 314$i$ and the exterior portion 314$e$ can be sized according to the design of the driver motor 300. It will be understood that other modifications to the driver motor 200, 300 can be made to reduce unnecessary use of steel without substantially affecting the overall performance of the acoustic transducer systems 100 described herein.

A magnetic element 316 can be positioned between the bottom plate 312 and the top plate 314 so that the magnetic element 316 is positioned within the path of the magnetic flux circuit or loop. The magnetic element 316 can be spaced away from the axial post 310 so that a driver cavity 350 can be provided.

A voice coil structure 340 operably coupled to the diaphragm 130 (not shown in FIG. 3) can move at least partially within the air gap 334 axially with respect to the center post 210. The voice coil 340$c$ wound around the voice coil structure 340 can have a coil height 340$h$. A reflective target region 342 can be provided at an interior surface of the voice coil structure 340.

Similar to the driver motor 200 in FIG. 2, driver motor 300 includes an optical sensor 360 with a light transmitter 362 for transmitting incident light 380$i$ towards the voice coil structure 340 and an optical detector 364 for receiving the reflected optical signal, 380$r$ resulting from the transmission of the incident light 380$i$ towards the voice coil structure 340. The optical sensor 260 can be coupled to a top surface 308 of the axial post 310 via a circuit board 366. The optical sensor 360 and the external portion of the position sensor 124 can be coupled via connections 372, 374 that are fed through a passage 304.

Figure 4:
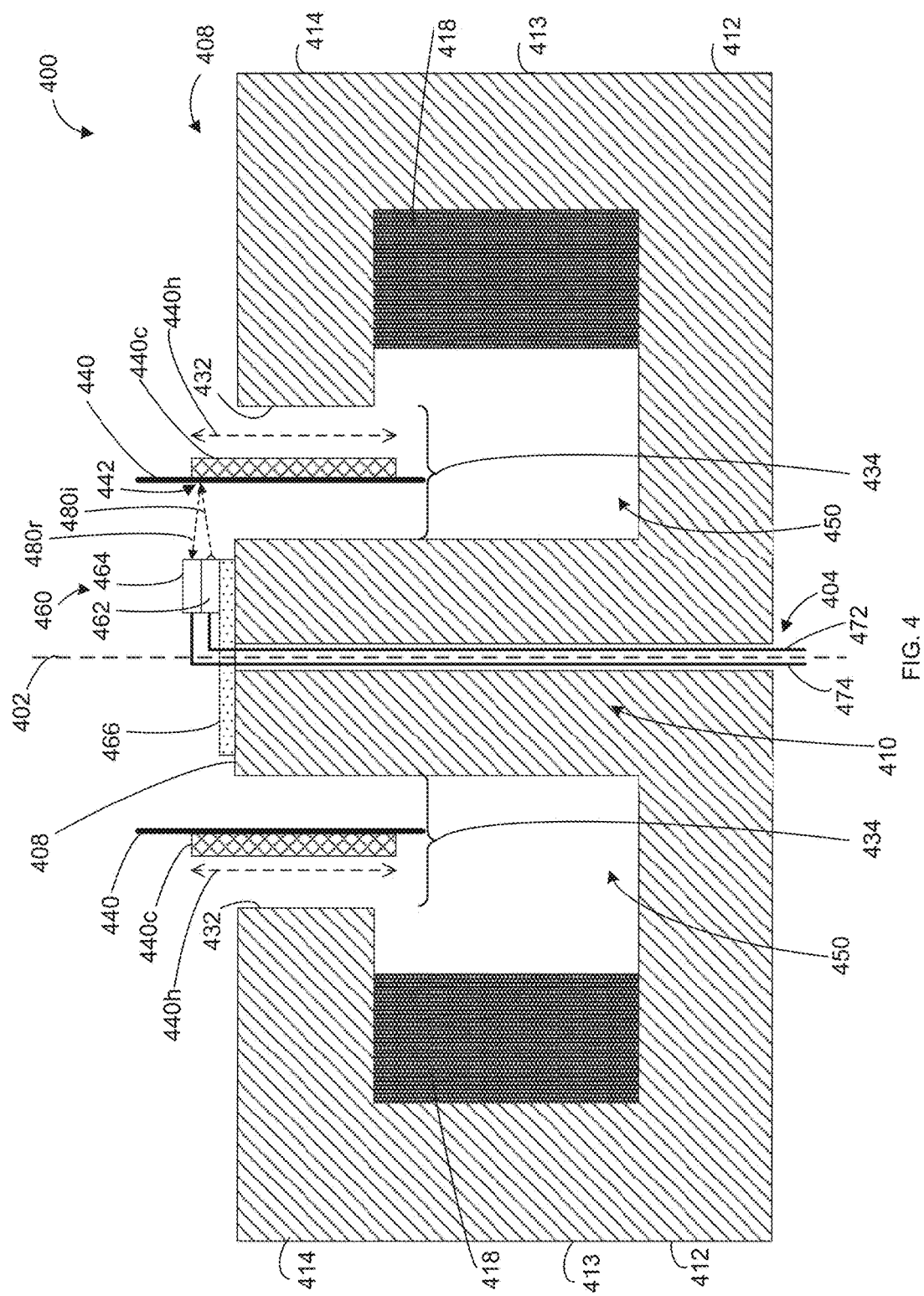
FIG. 4 is a cross-sectional view of another example driver motor operable in the acoustic transducer systems described herein.

Reference will now be made to FIG. 4. FIG. 4 is a cross-sectional view of an example driver motor 400 that is operable in the acoustic transducer systems described herein. A center axis 402 is shown in FIG. 4 for illustrative purposes. Similar to the driver motors 200 and 300, the driver motor 400 includes an axial post 410, a bottom plate 412 extending away from the axial post 410, and a top plate 414 with an interior surface 432 facing the axial post 410.

Unlike the driver motors 200 and 300, the driver motor 400 operates as an electromagnetic motor. As shown in FIG. 4, the driver motor 400 can include an annular wall 413 so that, together with the top plate 414, the axial post 410 and the bottom plate 412, a driver cavity 450 is defined. Within the driver cavity 450, the magnetic element 216 can be provided as a stationary coil 418 mounted in a fixed position relative to driver motor 400. A magnetizing signal can be provided to the stationary coil 418 so that at least some portion of the driver motor 400 is magnetized accordingly to produce magnetic flux in the air gap 434.

Figure 6:
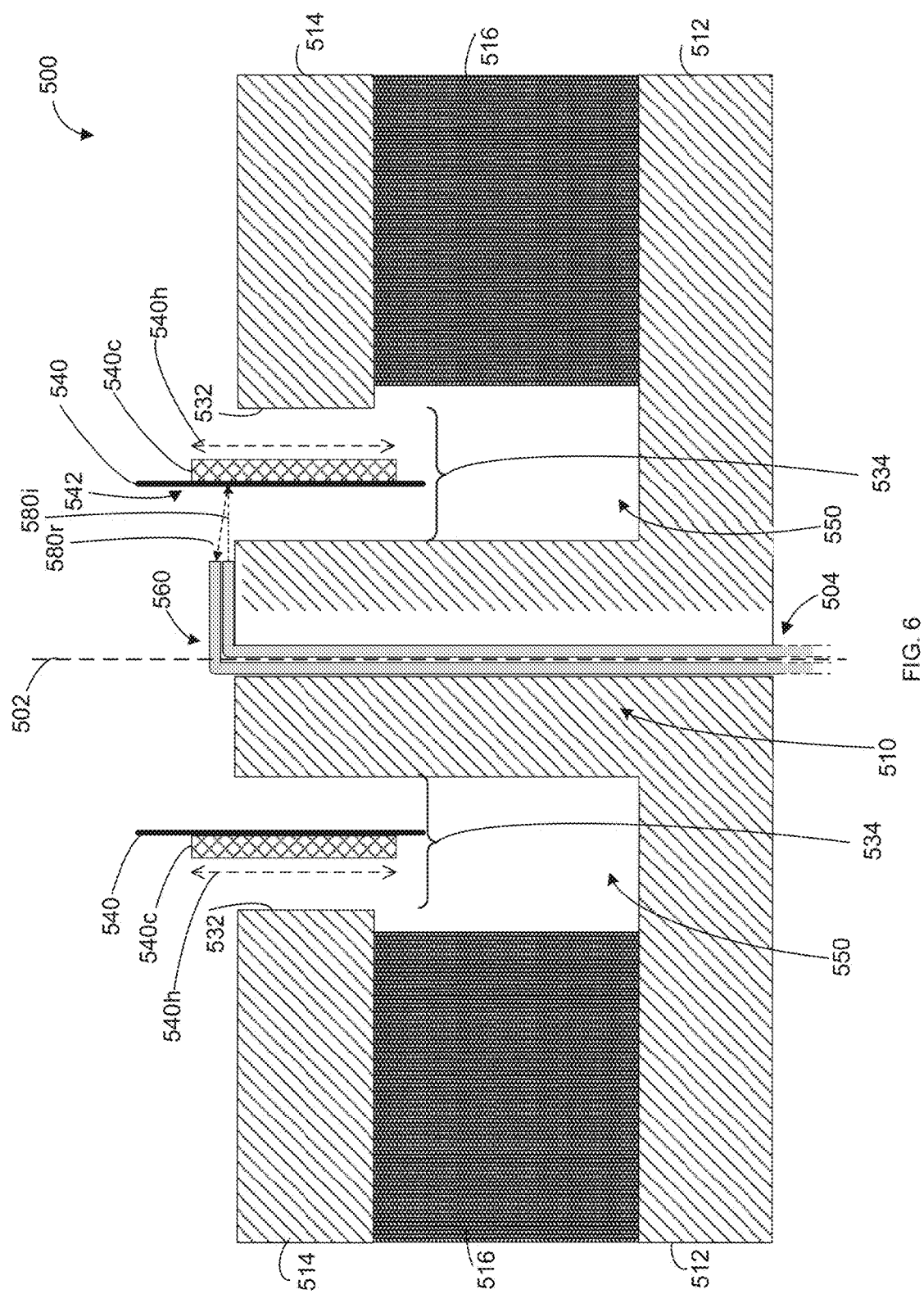
FIG. 6 is a cross-sectional view of another example driver motor operable in the acoustic transducer systems described herein.

FIG. 6 is a cross-sectional view of another example driver motor 500 operable in the acoustic transducer systems described herein. A center axis 502 is shown in FIG. 6 for illustrative purposes.

Similar to the driver motor 200, the driver motor 500 includes at least, an axial post 510, a bottom plate 512 extending away from the axial post 510, and a top plate 514 with an interior surface 532 facing the axial post 510. A magnetic element 516 can be positioned between the bottom plate 512 and the top plate 514 so that the magnetic element 516 is positioned within the path of the magnetic flux circuit or loop. The magnetic element 516 can be spaced away from the axial post 510 so that a driver cavity 550 can be provided. A passage 504 is also defined in the axial post 510.

The top plate 514 and the axial post 510 also define an air gap 534 therebetween. A voice coil 540$c$, with a coil height 540$h$, can be wound around a voice coil structure 540. The voice coil structure 540 can be operably coupled to the diaphragm 130 (not shown in FIG. 6) and can move at least partially within the air gap 534 axially with respect to the axial post 510.

Unlike the driver motor 200, the driver motor 500 includes a set of fiber optic cables, generally shown as 570, for transmitting an incident light signal 580$i$ and receiving a reflected optical signal 580$r$. As shown in FIG. 6, the set of fiber optic cables 560 can be fed through the passage 504 to connect with the external portion of the position sensor 124.

The set of fiber optic cables 560, as will be described with reference to FIGS. 7 to 9, can include one or more fiber optic cables. Some or all of the fiber optic cables may be formed of plastic and/or glass depending on the application with the acoustic transducer system. For example, a fiber optic cable being used for transmitting a light signal may be formed of glass while a fiber optic cable being used for receiving a reflected optical signal may be formed of plastic. The fiber optic cables can, in some embodiments, be provided as a fiber optic bundle.

FIGS. 7A to 7D are cross-sectional views of different example fiber optic bundles. Berkovic et al. describe different example fiber optic bundles in "Optical Methods for Distance and Displacement Measurements" (Advances in Optics and Photonics (2012), vol. 4, issue 4, pp. 441-471).

Figure 7B:
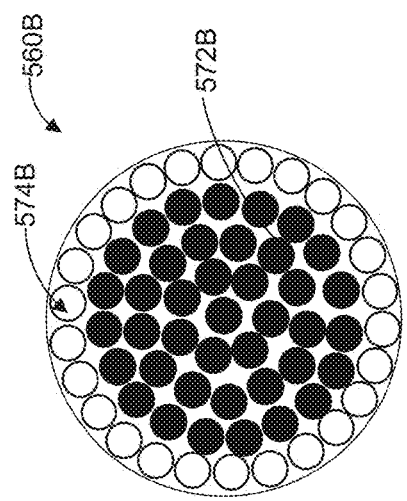
FIGS. 7A to 7D are cross-sectional views of different fiber optic bundles in accordance with some example embodiments.
Figure 7D:
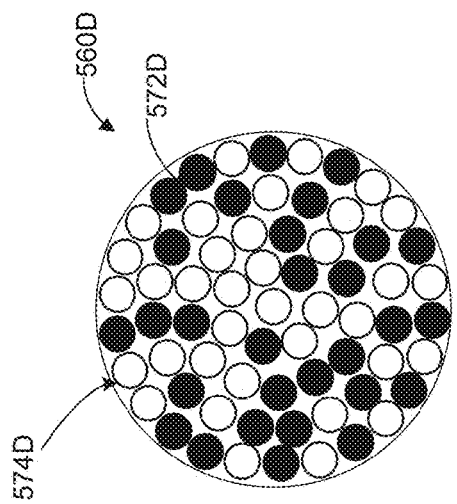
Figure 7A:
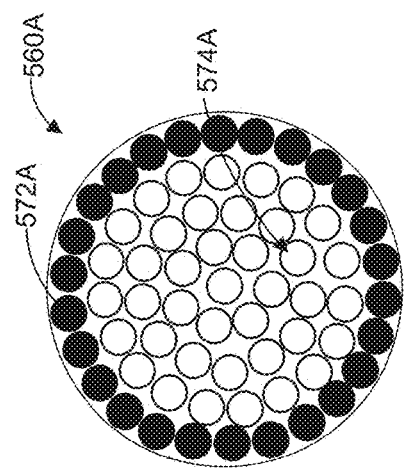

FIG. 7A is a cross-sectional view of an example fiber optic bundle 560A in which transmitting fiber optics 572A are concentric around a perimeter of the fiber optic bundle 560A while the receiving fiber optic cables 574A are central within the fiber optic bundle 560A.

FIG. 7B is a cross-sectional view of an example fiber optic bundle 560B in which transmitting fiber optics 572B are central within the fiber optic bundle 560B while the receiving fiber optic cables 574B are concentric around a perimeter of the fiber optic bundle 560B.

Figure 7C:
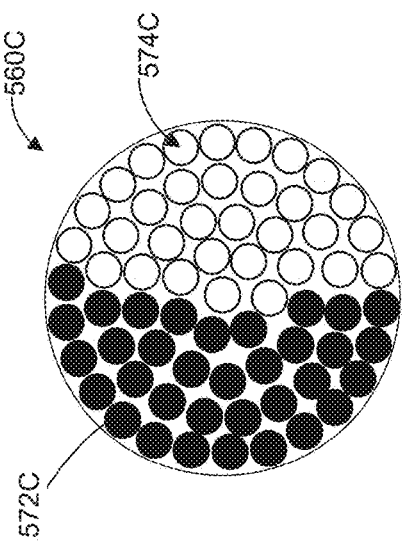

FIG. 7C is a cross-sectional view of an example fiber optic bundle 560C in which the transmitting fiber optics 572C and the receiving fiber optic cables 574C are organized in a hemispherical manner.

FIG. 7D is a cross-sectional view of an example fiber optic bundle 560D in which the transmitting fiber optics 572D and the receiving fiber optic cables 574D are organized in a random manner.

One or more of each of the fiber optic bundles 560A to 560D shown in FIGS. 7A to 7D may be used in the set of fiber optic cables 560. Example configurations of the set of fiber optic cables 560 will now be described with reference to FIGS. 8 and 9.

Figure 8:
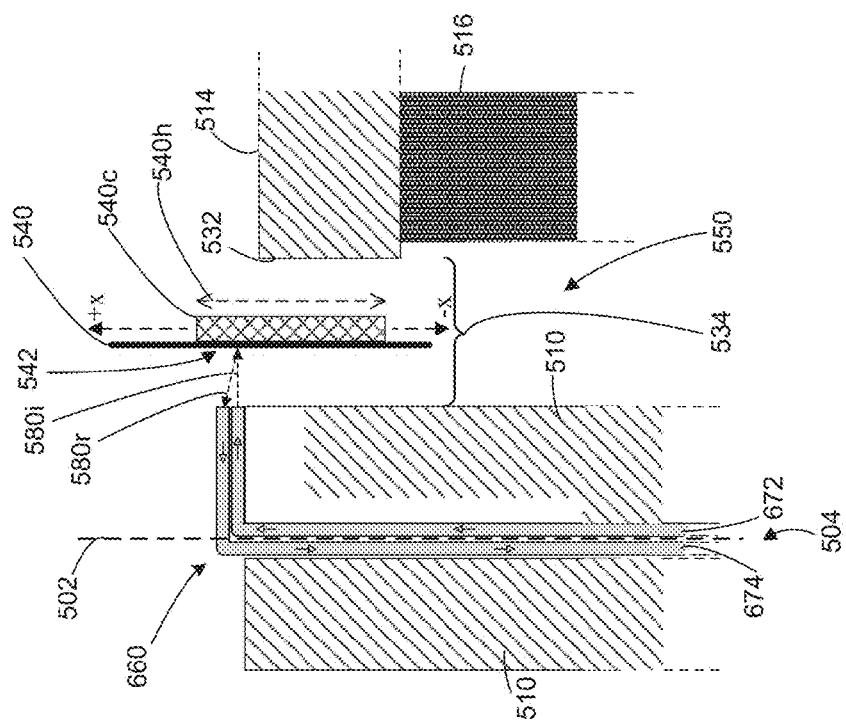
FIG. 8 is a partial cross-sectional view of a portion of an example position sensor in the driver motor shown in FIG. 6.

FIG. 8 is a partial cross-sectional view of a portion of an example position sensor generally shown at 660 for the driver motor 500 shown in FIG. 6. For ease of exposition, only a portion of the driver motor 500 is shown in FIG. 8.

The portion of the position sensor 660 shown in FIG. 8 can be formed with a first fiber optic cable 672 and a second fiber optic cable 674 that are passed through the passage 504. As shown, the first fiber optic cable 672 and the second fiber optic cable 674 can act as light pipes.

Although not shown in FIG. 8, the first fiber optic cable 672 and the second fiber optic cable 674 can be coupled to the external portion of the position sensor 124 for receiving and transmitting the respective light and optical signals. For example, the position sensor 124 can initiate a transmission of the incident light 580$i$ towards the voice coil structure 540 via the first fiber optic cable 672 and receive the reflected optical signal 580$r$ from the voice coil structure 540 via the second fiber optic cable 674.

Figure 9:
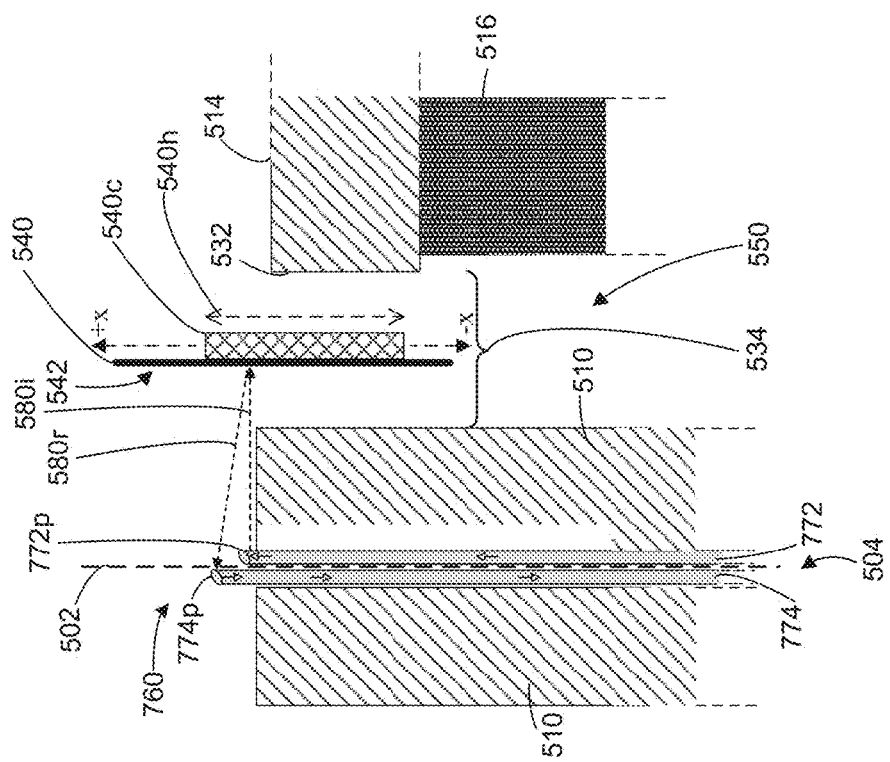
FIG. 9 is a partial cross-sectional view of a portion of another example position sensor in the driver motor shown in FIG. 6.

FIG. 9 is a partial cross-sectional view of a portion of another example position sensor generally shown at 760 for the driver motor 500 shown in FIG. 6. Similar to FIG. 8, for ease of exposition, only a portion of the driver motor 500 is shown in FIG. 9.

The portion of the position sensor 760 in FIG. 9 can be formed with a first fiber optic cable 772 and a second fiber optic cable 774. Unlike the first and second fiber optic cables 672, 674 in FIG. 8, the probe tip of each of the first fiber optic cable 772 and the second fiber optic cable 774 is coupled with an optical component for directing the respective optical signals in another direction. For example, in FIG. 9, the probe tip of the first fiber optic cable 772 can be formed with a prism 772$p$ that directs the incident light 580$i$ received from the position sensor 124 in a substantially orthogonal direction towards the voice coil structure 540. Similarly, the probe tip of the second fiber optic cable 774 can be formed with a prism 774$p$ that directs the reflected optical signal 580$r$ resulting from the interaction between the incident light 580$i$ and the voice coil structure 540 in a substantially orthogonal direction towards the position sensor 124. Example fiber optic cables 772, 774 with the prisms 772$p$ and 774$p$ include MTI Instruments™ Fotonic Edge™ probe. Other example optical components that can be mounted to the probe tips of the fiber optic cables 772, 774 can include any components that can direct optical signals in a relatively controlled direction, such as a lens, a mirror and other similar components.

With the use of the optical components, the fiber optic cables 772, 774 do not need to be physically deformed, unlike the fiber optic cables 672, 674 in FIG. 8.

Figure 10:
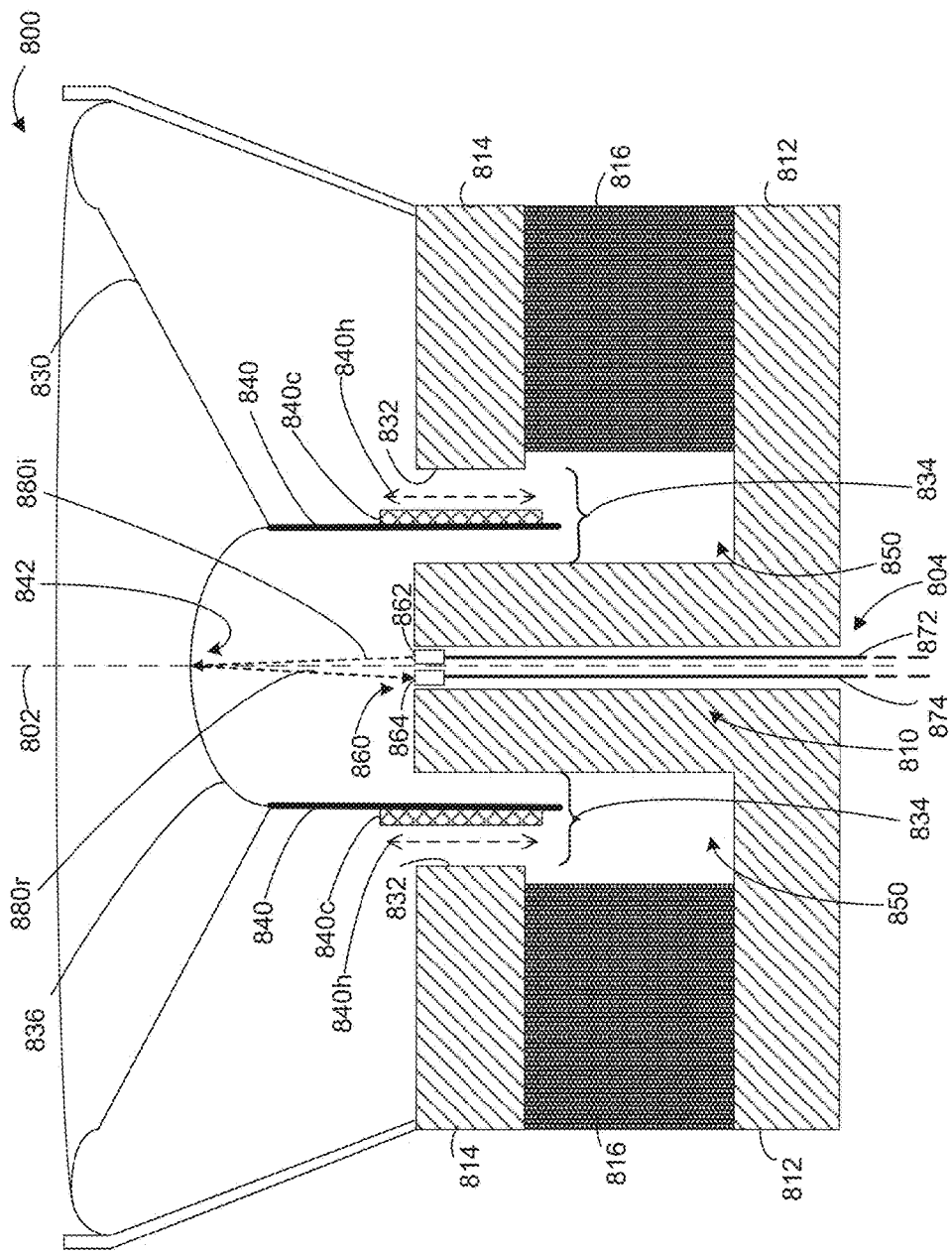
FIG. 10 is a cross-sectional view of an example driver operable in the acoustic transducer systems described herein.

FIG. 10 is a cross-sectional view of an example driver 800 operable in the acoustic transducer systems described herein. A center axis 802 is shown in FIG. 10 for illustrative purposes.

Similar to the driver motors 200, 300 and 400, the driver motor of the driver 800 includes at least, an axial post 810, a bottom plate 812 extending away from the axial post 810, and a top plate 814 with an interior surface 832 facing the axial post 810. A magnetic element 816 can be positioned between the bottom plate 812 and the top plate 814 so that the magnetic element 816 is positioned within the path of the magnetic flux circuit or loop. The magnetic element 816 can be spaced away from the axial post 810 so that a driver cavity 850 can be provided. A passage 804 is also defined in the axial post 810.

The top plate 814 and the axial post 810 also define an air gap 834 therebetween. A voice coil 840$c$, with a coil height 840$h$, can be wound around a voice coil structure 840. The voice coil structure 840 can be operably coupled to the diaphragm 830 and can move at least partially within the air gap 834 axially with respect to the driver 800.

Unlike the driver motors 200, 300 and 400, the driver motor of the driver 800 includes an optical sensor 860 positioned substantially within the passage 804. In the example shown in FIG. 10, the optical sensor 860 includes a light transmitter 862 for transmitting an incident light 880$i$ towards the diaphragm 830, such as an inner surface of a dust cap 836, and an optical detector 864 for receiving a reflected optical signal 880$r$ from the diaphragm 830. The optical sensor 860 and the external portion of the position sensor 124 (not shown in FIG. 10) can be coupled via connections 872, 874 that are fed through the passage 804, as shown in FIG. 10.

In the embodiment shown in FIG. 10, the distance between the optical sensor 860 and the diaphragm 130 varies with the movement of the diaphragm 130, or displacement of the diaphragm 130 relative to the reference position. A reflective target region 842 can be provided at the inner surface of the dust cap 836. Unlike the reflective target regions 242$a$, 242$b$ shown in FIGS. 5A and 5B, the reflective target region 842 does not need to vary the amount of reflectivity with the displacement of the diaphragm 130 since the distance between the optical sensor 860 and the diaphragm 130 varies with the movement of the diaphragm 130. Instead, the reflective target region 842 can be formed to provide a reflectivity at a desired operational wavelength and the intensity of the reflected optical signal 880$r$ can vary due to the movement of the diaphragm 130. The reflective target region 842 may be formed by various methods, such as coating and/or printing, for example.

In some alternative embodiments, the optical sensor 860 and connections 872, 874 can be replaced with a set of optic fibers, such as 560 in FIG. 6, or one or more electronic connections together with a set of optic fibers 560, for transmitting the incident light 880$i$ towards the diaphragm 830 and receiving the reflected optical signal 880$r$ from the diaphragm 830. An example driver 900 is shown in FIG. 11.

Figure 11:
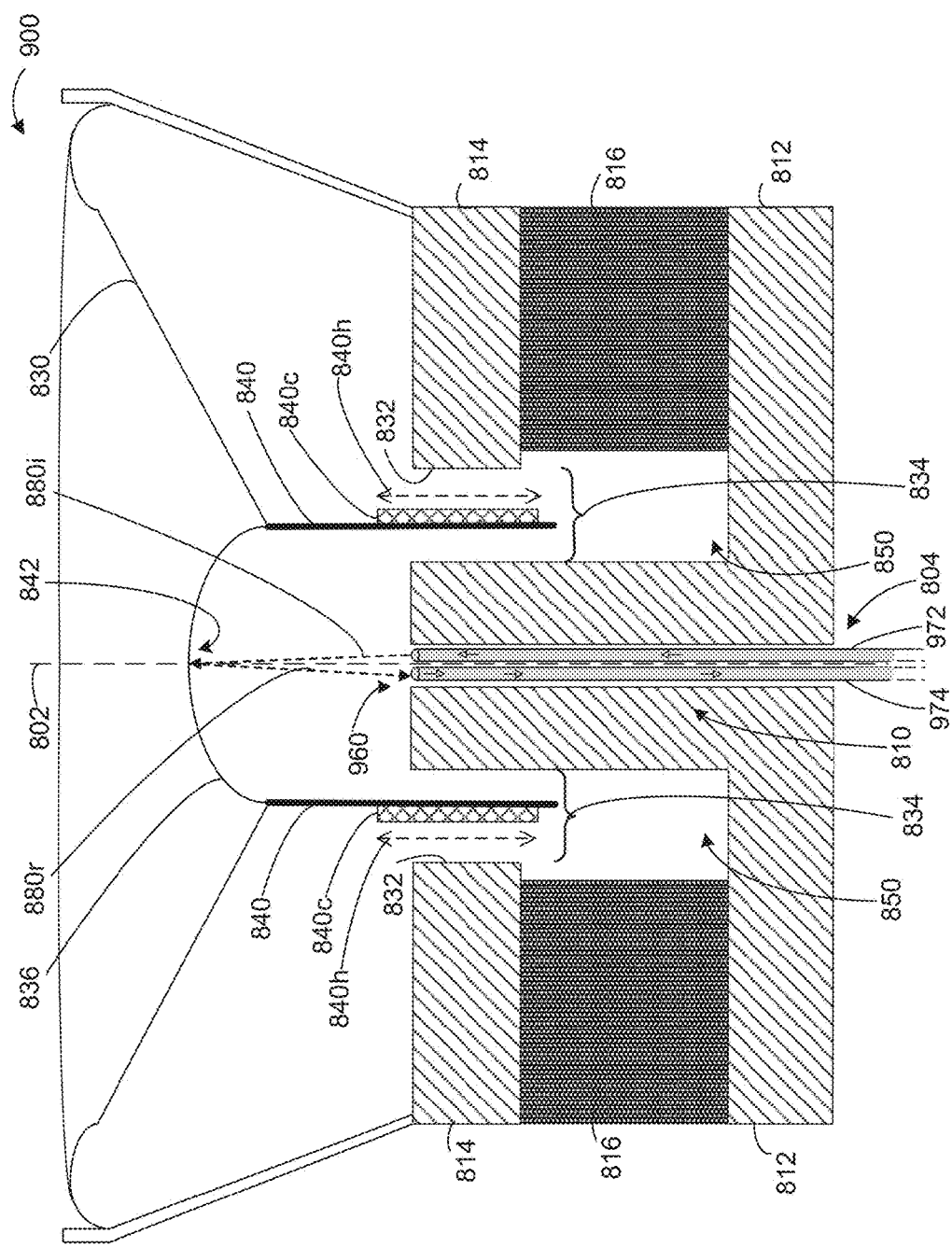
FIG. 11 is a cross-sectional view of another example driver operable in the acoustic transducer systems described herein.

FIG. 11 is a cross-sectional view of an example driver 900 operable in the acoustic transducer systems described herein. The driver 900 is generally similar to the driver 800 shown in FIG. 10. However, instead of mounting the optical sensor 860 in the passage 804, a set of fiber optic cables 960 is provided in the passage 804 for transmitting the incident light 880$i$ towards the diaphragm 830 and the reflected optical signal 880$r$ towards the external portion of the position sensor 124. The set of fiber optic cables 960 can include a first fiber optic cable 972 for transmitting the incident light 880$i$ towards the diaphragm 830 and a second fiber optic cable 974 for receiving a reflected optical signal 880$r$ from the diaphragm 830.

Figure 12:
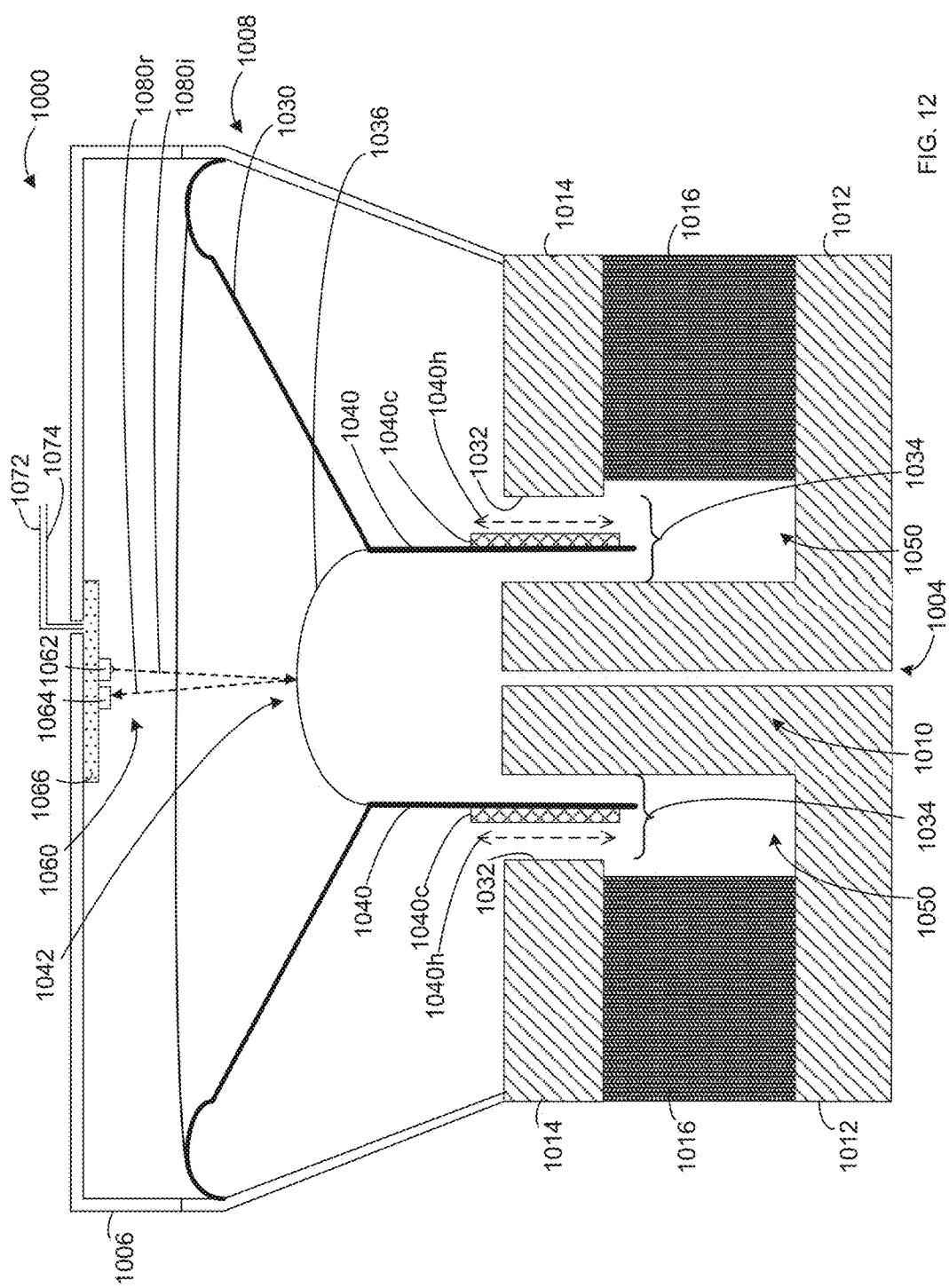
FIG. 12 is a cross-sectional view of a further example driver operable in the acoustic transducer systems described herein.

FIGS. 12 and 13 illustrate example drivers 1000 and 1100. Unlike the driver motors 200, 300, 400, and 500, and the driver motors of drivers 800 and 900, the optical sensors 1060 and 1160 are located external to the bodies 1008 and 1108 of the respective driver motors of the drivers 1000 and 1100.

Reference will now be made to FIG. 12. The driver 1000 includes an axial post 1010, a bottom plate 1012 extending away from the axial post 1010, and a top plate 1014 with an interior surface 1032 facing the axial post 1010. A magnetic element 1016 can be positioned between the bottom plate 1012 and the top plate 1014 so that the magnetic element 1016 is positioned within the path of the magnetic flux circuit or loop. The magnetic element 1016 can be spaced away from the axial post 1010 so that a driver cavity 1050 can be provided. A passage 1004 can also be provided in the axial post 1010. The top plate 1014 and the axial post 1010 also define an air gap 1034 therebetween. A voice coil 1040c, with a coil height 1040h, can be wound around a voice coil structure 1040. The voice coil structure 1040 can be operably coupled to the diaphragm 1030 and can move at least partially within the air gap 1034 axially with respect to the driver 1000.

Unlike the driver motors 200, 300, 400, and 500, and the driver motors of drivers 800 and 900, the optical sensor 1060 of the driver 1000 is mounted to a sensor support 1006 shown in FIG. 12. The sensor support 1006 can generally be rigid in order to maintain a position of the optical sensor 1060 with respect to the diaphragm 1030. The sensor support 1006 may be provided as a space frame or similar structure that can retain the optical sensor 1060 at the desired position. For example, the sensor support 1006 can be or include a rigid grill or rigid cover.

As shown in FIG. 12, the sensor support 1006 is mounted to the driver 1000 and the optical sensor 1060 is mounted to the sensor support 1006 substantially across from the dust cap 1036. The optical sensor 1060 can be mounted to the sensor support 1006 via a circuit board 1066. The optical sensor 1060 includes a light transmitter 1062 that can transmit an incident light 1080i towards the dust cap 1036 at the diaphragm 1030, and an optical detector 1064 that can receive a reflected optical signal 1080r from the dust cap 1036. The optical sensor 1060 and the external portion of the position sensor 124 (not shown in FIG. 9) can be coupled via connections 1072, 1074 that are fed through an aperture in the sensor support 1006, as shown in FIG. 12.

Similar to the reflective target region 842 provided at the dust cap 836 shown in FIG. 10, a reflective target region 1042 can also be provided at an outer surface of the dust cap 1036.

In some alternative embodiments, the optical sensor 1060 and connections 1072, 1074 can be replaced with a set of optic fibers, such as 560 in FIG. 6, or one or more electronic connections together with a set of optic fibers 560, for transmitting the incident light 1080i towards the diaphragm 1030 and receiving the reflected optical signal 1080r from the diaphragm 1030. An example driver 1100 is shown in FIG. 13.

FIG. 13 is a cross-sectional view of an example driver 1100 operable in the acoustic transducer systems described herein. The driver 1100 is generally similar to the driver 1000 shown in FIG. 12. However, instead of mounting the optical sensor 1060 to the sensor support 1006, a set of fiber optic cables 1160 is fed through an aperture provided in the sensor support 1006 for transmitting the incident light 1180i towards the diaphragm 1030 and the reflected optical signal 1180r towards the external portion of the position sensor 124 (not shown). The set of fiber optic cables 1160 can include a first fiber optic cable 1172 for transmitting the incident light 1180i towards the diaphragm 1030 and a second fiber optic cable 1174 for receiving a reflected optical signal 1180r from the diaphragm 1130.

The connections 1072, 1074 (FIG. 12) and fiber optic cables 1172, 1174 (FIG. 13) are shown to be routed external to the sensor support 1006. In some other embodiments, the connections 1072, 1074 and fiber optic cables 1172, 1174 may instead be routed along an inner surface of the sensor support 1006 so that the connections 1072, 1074 and fiber optic cables 1172, 1174 are not fed through an aperture defined in the sensor support 1006.

FIGS. 2 to 13 illustrate various example applications of optical positioning sensing in acoustic transducer systems. Reference will now be made to FIGS. 14A to 20B, which illustrate various embodiments of position sensing in acoustic transducer systems based on strain measurements. As will be described with reference to FIGS. 14A to 20B, sensors with electrical characteristics that can be varied due to the amount of deformation, or strain, within the sensor can be used for position sensing in acoustic transducers.

Figures 14A, 14B:
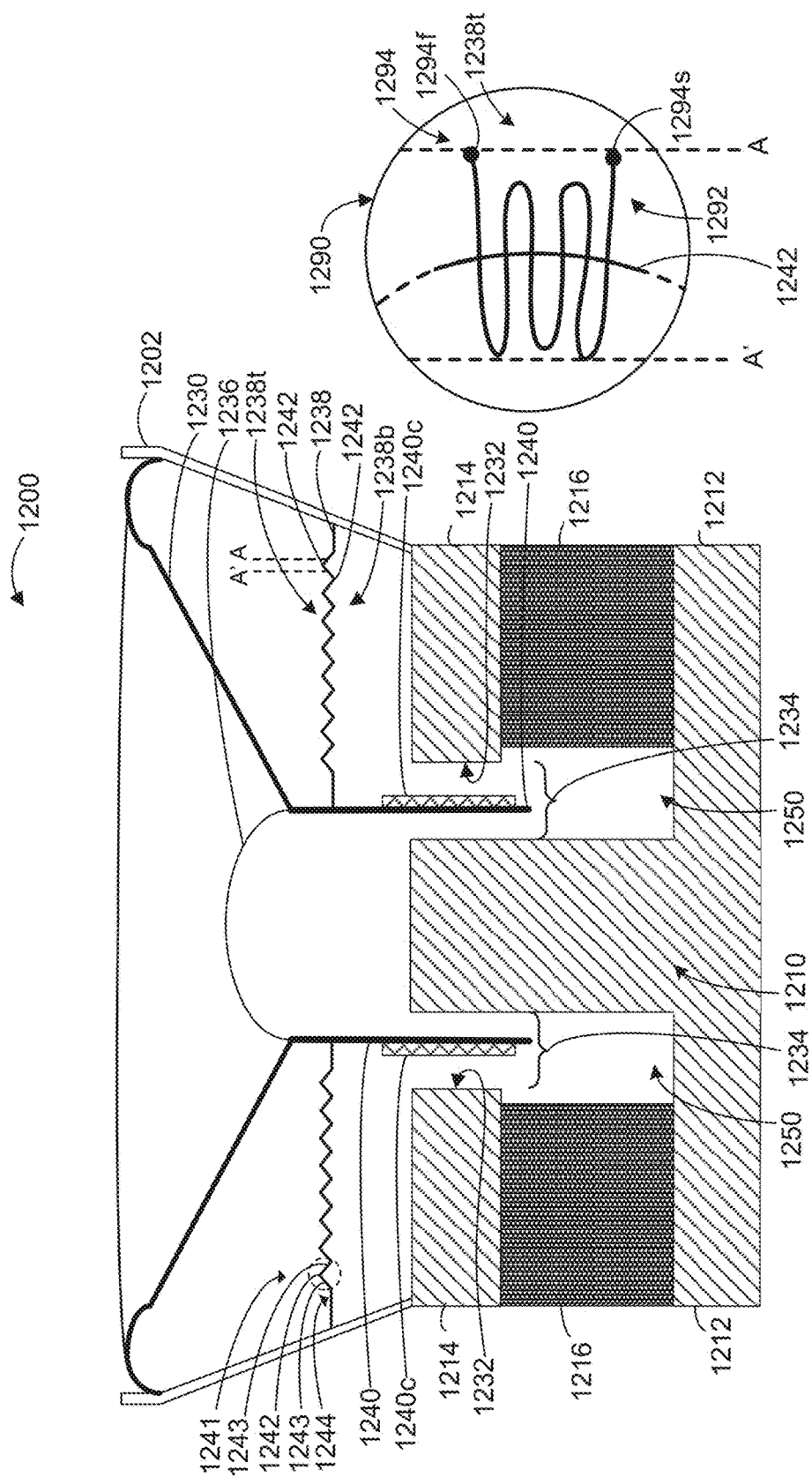
FIG. 14A is a cross-sectional view of another example driver operable in the acoustic transducer systems described herein.
FIG. 14B is a plan view of a portion of a spider of the driver shown in FIG. 14A.

Similar to the driver 800 shown in FIG. 10, the example driver 1200 shown in FIG. 14A includes, at least, an axial post 1210, a bottom plate 1212 extending away from the axial post 1210, and a top plate 1214 with an interior surface 1232 facing the axial post 1210. A magnetic element 1216 can be positioned between the bottom plate 1212 and the top plate 1214 so that the magnetic element 1216 is positioned within the path of the magnetic flux circuit or loop. The magnetic element 1216 can be spaced away from the axial post 1210 so that a driver cavity 1250 can be provided.

Unlike the driver 800, the driver 1200 shown in FIG. 14A does not include a passage in the axial post 1210. It will be understood that, although not shown in FIG. 14A, a passage may be defined in the axial post 120 depending on the operating characteristics and/or design of the driver 1200.

The top plate 1214 and the axial post 1210 also define an air gap 1234 therebetween. A voice coil 1240c can be wound around a voice coil structure 1240. The voice coil structure 1240 can be operably coupled to the diaphragm 1230 and can move at least partially within the air gap 1234 axially with respect to the driver 1200.

The diaphragm 1230, as shown in FIG. 14A, is operably coupled with the voice coil structure 1240. The diaphragm 1230 also includes a dust cap 1236. Also shown in FIG. 14A is a spider 1238 coupled with the voice coil structure 1240 and a frame 1202 of the driver 1200. For ease of reference, a top surface of the spider 1238 is shown generally in FIG. 14A as 1238t and a bottom surface of the spider 1238 is shown generally in FIG. 14A as 1238b. FIG. 14B is a plan view 1290 of a portion of the top surface 1238t of the spider 1238 of the driver 1200 shown in FIG. 14A.

Unlike the acoustic transducer systems described with reference to FIGS. 2 to 13, the operation of the driver 1200 does not involve optical position sensing. Instead, position sensing at the driver 1200 involves a combination of tensile and compressive strain measurement at the spider 1238 during the operation of the driver 1200. As shown in FIG. 14B, the spider 1238 is formed of one or more folds 1241. Each fold 1241 has an apex 1242 and two substantially straight segments 1243.

As shown in FIG. 14B, a strain gauge sensor 1292 is provided at the top surface 1238t of the spider 1238 and at the apex 1242 of the spider 1238. During the operation of the driver 1200, the shape change at the apex 1242 is typically greater than shape changes at the substantially straight segments 1243. By providing the strain gauge sensors 1292 at the apex 1242, more sensitive strain measurements can be obtained. In some embodiments, the strain gauge sensor 1292 can be provided at the bottom surface 1238*b*.

Although only one strain gauge sensor 1292 is shown in FIGS. 14A to 16B, more than one strain gauge sensor 1292 may be provided at the spider 1238. In some embodiments, multiple strain gauge sensors 1292 can be positioned on both the top surface 1238*t* and the bottom surface 1238*b* of the spider 1238.

A greater number of strain gauge sensors 1292 can provide additional measurement values so that the overall strain measurement can increase in sensitivity and accuracy. While the driver 1200 is in operation, the folds 1241 at the spider 1238 will expand and contract with the motion of the diaphragm 1230. The shape of each fold 1241 at the spider 1238 will change differently from each of the other folds 1241. Therefore, the measurement of the displacement of the voice coil structure 1240 can be improved when strain measurement values are obtained from a greater number of apexes 1242. In some embodiments, a strain measurement value can be obtained from each apex 1242 at the spider 1238.

In some embodiments, more than one group of strain gauge sensors 1292 can be positioned radially around the spider 1238. Each group of strain gauge sensors can include one or more strain gauge sensors 1292. In some embodiments, three or four groups of strain gauge sensors 1292 can be positioned at the spider 1238. In some embodiments, each group of strain gauge sensors 1292 can be spaced apart substantially equiangular with respect to the perimeter of the spider 1238. The resistive measurements received via those strain gauge sensors 1292 can then be considered together for determining the displacement of the voice coil structure 1240 relative to its initial position.

For example, each of the strain measurement from each strain gauge sensor 1292 may be summed to provide the overall strain measurement. In some embodiments, the resistive measurements received from each strain gauge sensor 1292 from the multiple groups of strain gauge sensors 1292 at the spider 1238 can be averaged to generate an overall resistive measurement for determining the corresponding displacement of the voice coil structure 1240 relative to its initial position. The averaging may be implemented with active electronics or passively by connecting the strain gauge sensors 1292 in series or series parallel combinations.

The strain gauge sensor 1292 may be provided at the spider 1238 in various ways, such as being attached to the top surface 1238*t* and/or the bottom surface 1238*b* of the spider 1238 with a suitable adhesive material, embedded within the spider 1238, or printed onto the top surface 1238*t* and/or the bottom surface 1238*b* of the spider 1238.

The strain gauge sensor 1292 includes measurement terminals 1294, such as a first terminal 1294*f* and second terminal 1294*s*. In some embodiments, the measurement terminals 1294 may be printed onto an inner surface of the frame 1202.

The electrical resistance can be measured between the first terminal 1294*f* and the second terminal 1294*s* to infer the corresponding strain at the spider 1238. As will be described with reference to FIGS. 14B, 15B and 16B, the strain measured at each of the strain gauge sensors 1292 can be used to infer the displacement of the voice coil structure 1240 relative to its initial position. The voice coil structure 1240 shown in FIG. 14A is at the initial position while the voice coil structure 1240 shown in each of FIGS. 15A and 16A are at different operating states.

The strain gauge sensor 1292 shown in FIG. 14B is at an initial, or resting, position since the voice coil structure 1240 and the diaphragm 1230 are not in motion. For reference, one end of the strain gauge sensor 1292 (e.g., where the measurement terminals 1294 are positioned) is at position "A" while the other end of the strain gauge sensor 1292 is at position "A'". As will be described with reference to FIGS. 15A to 16B, the shape of the strain gauge sensor 1292 will vary as the apex 1242 expands and contracts with the motion of the diaphragm 1230.

FIG. 15A shows the driver 1200 at a first operating state. In the first operating state, the voice coil structure 1240 and the diaphragm 1230 are moving upwards away from the axial post 1210. As a result, the apex 1242 expands and the shape of the strain gauge sensor 1292 is correspondingly deformed. FIG. 15B illustrates the deformed strain gauge sensor 1292'. The end of the strain gauge sensor 1292 at position "A'" is now deformed to position "B". With the deformed strain gauge sensor 1292', a higher resistance can be measured between the first and second terminals 1294*f* and 1294*s*, respectively.

Similarly, FIG. 16A shows the driver 1200 at a second operating state. In the second operating state, the voice coil structure 1240 and the diaphragm 1230 are moving downwards towards the axial post 1210. As a result, the apex 1242 expands and the shape of the strain gauge sensor 1292 is correspondingly deformed. FIG. 16B illustrates the deformed strain gauge sensor 1292". The end of the strain gauge sensor 1292 at position "A" is now deformed to position "C". Similar to the deformed strain gauge sensor 1292' in FIG. 15B, a higher resistance can be measured between the first and second terminals 1294*f* and 1294*s*, respectively, of the deformed strain gauge sensor 1292".

Figure 14D:
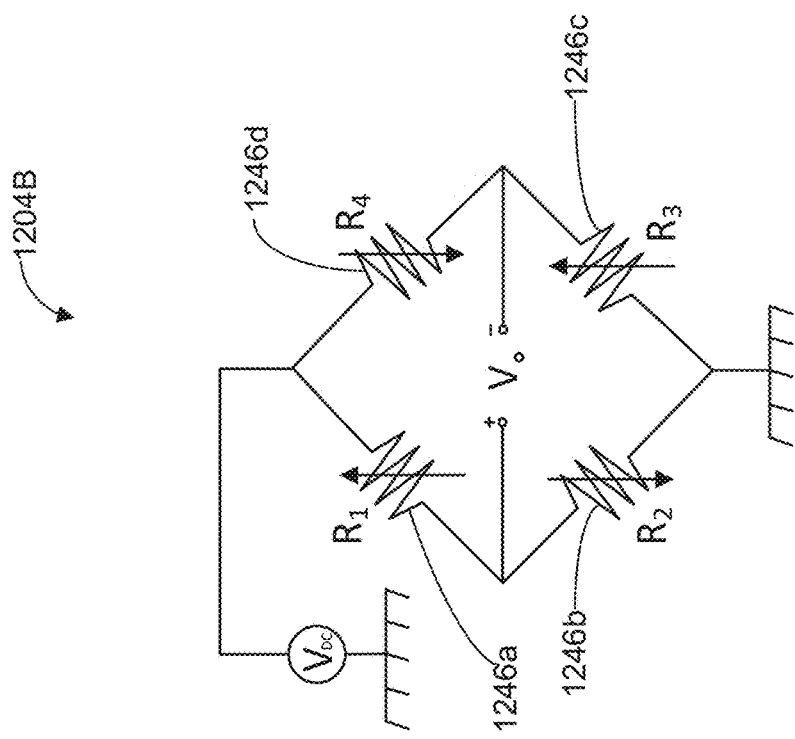
FIG. 14D shows an equivalent circuit representative of a portion of the spider shown in FIG. 14C.
Figure 14C:
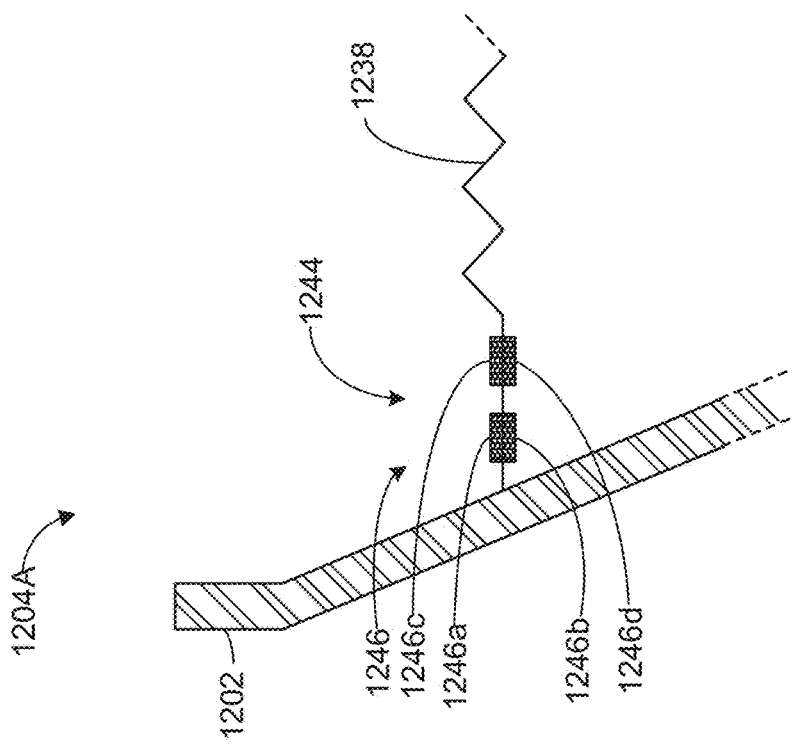
FIG. 14C is a partial cross-sectional view of another example portion of the spider of the driver shown in FIG. 14A.

To facilitate the determination of a displacement direction of the voice coil structure 1240, a displacement direction strain gauge 1246 may be provided at an outer perimeter (shown generally as 1244) of the spider 1238. The displacement direction strain gauge 1246 may represent the displacement direction with a positive sign ("+") or a negative sign ("−"). Reference will now be made to FIGS. 14C and 14D.

FIG. 14C is a partial cross-sectional view 1204A of an example portion of the spider 1238 of the driver 1200. The displacement direction strain gauge 1246 shown in FIG. 14C is provided at the outer perimeter 1244 of the spider 1238. The displacement direction strain gauge 1246 includes resistive components 1246*a*, 1246*b*, 1246*c* and 1246*d*. FIG. 14D shows an equivalent circuit 1204B representative of the displacement direction strain gauge 1246 shown in FIG. 14C.

With the displacement strain gauge 1246 shown in FIG. 14C, the displacement direction of the voice coil structure 1240 can be inferred from the resulting resistance measurements. When the displacement of the voice coil structure 1240 is outwards, or upwards away from the axial post 1210 as shown in FIG. 15A, a top surface of the displacement strain gauge 1246 experiences a compressive strain so that the overall resistance is reduced. When the displacement of the voice coil structure 1240 is inwards, or downwards towards the axial post 1210 as shown in FIG. 16A, a top surface of the displacement strain gauge 1246 experiences a tensile strain so that the overall resistance increases.

Figure 17A:
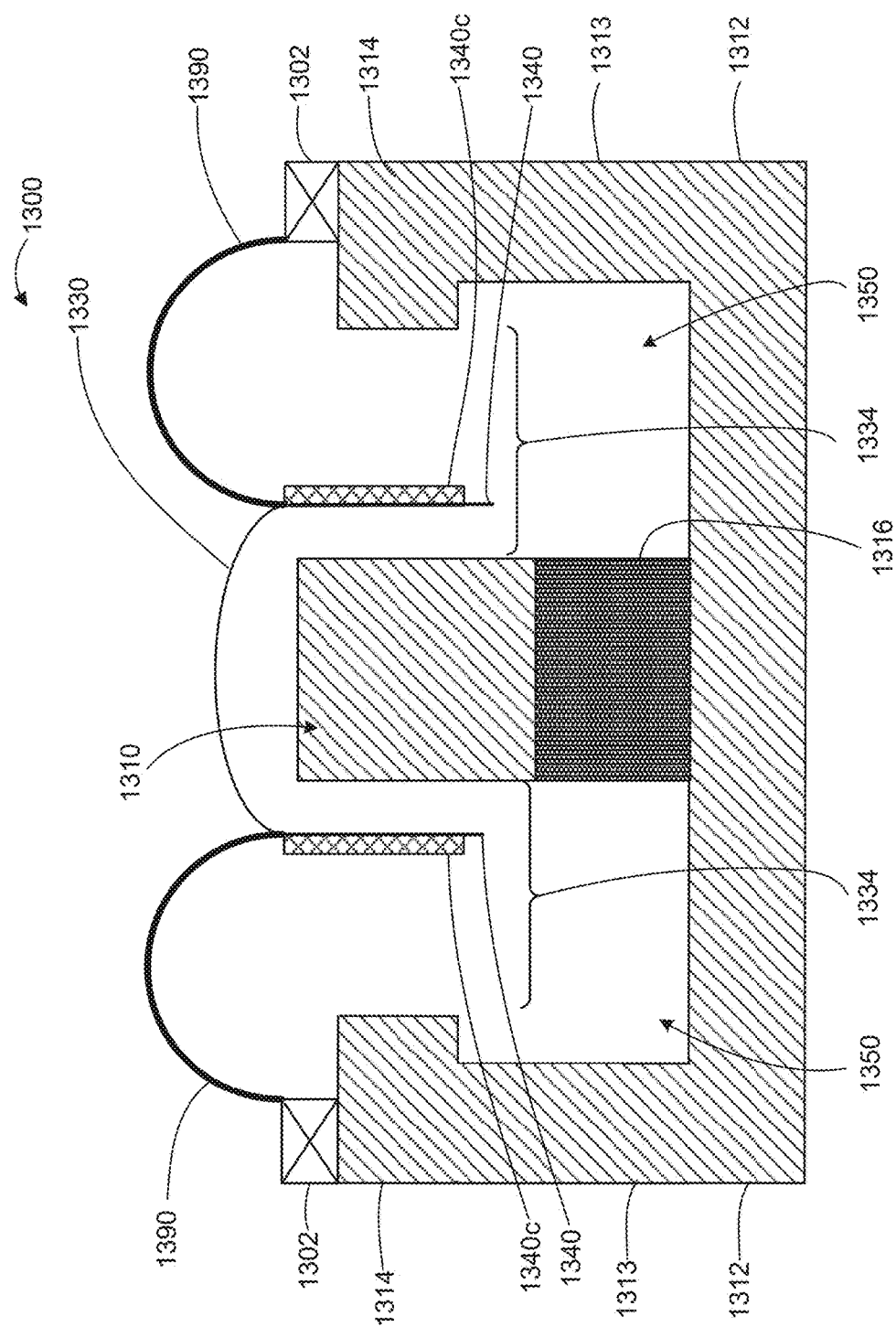
FIG. 17A is a cross-sectional view of an example micro acoustic driver operable in the acoustic transducer systems described herein.
Figure 17B:
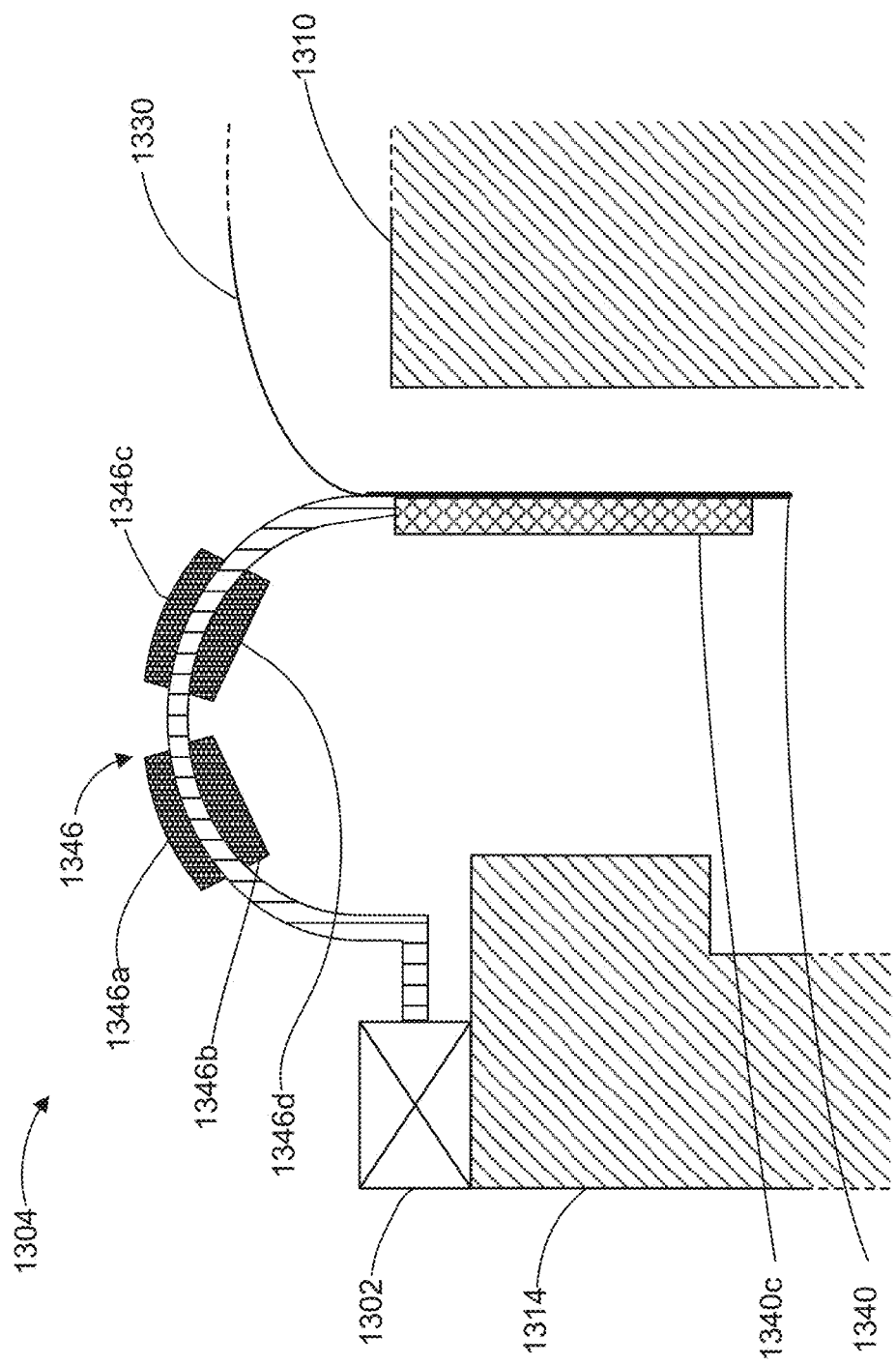
FIG. 17B is a partial cross-sectional view of the example micro acoustic driver shown in FIG. 17A.

The configuration of the displacement strain gauge 1246 can also be used in micro acoustic transducer systems. Unlike drivers such as 1200, micro drivers do not include spiders due to the limited space. Reference will now be made to FIGS. 17A and 17B.

FIG. 17A is a cross-sectional view of an example micro driver 1300 and FIG. 17B is a partial cross-sectional view 1304 of the micro driver 1300. As shown in FIG. 17A, micro driver 1300 includes an axial post 1310, a bottom plate 1312 extending away from the axial post 1310, and a top plate 1314 with an interior surface facing the axial post 1310. An outer wall 1313 couples the top plate 1314 with the bottom plate 1312. A magnetic element 1316 can be positioned between the bottom plate 1312 and the axial post 1310 so that the magnetic element 1316 is positioned within the path of the magnetic flux circuit or loop.

The magnetic element 1316 and the axial post 1310 can be spaced away from the outer wall 1313 so that a driver cavity 1350 can be provided The top plate 1314 and the axial post 1310 define an air gap 1334 therebetween. A voice coil 1340c can be wound around a voice coil structure 1340. The voice coil structure 1340 can be operably coupled to the diaphragm 1330 and can move at least partially within the air gap 1334 axially with respect to the micro driver 1300.

As shown in FIGS. 17A and 17B, a strain gauge 1346 can be at an annular ring 1390 that acts as a mechanical interface between the frame 1302 and the diaphragm 1330 of the micro driver 1300.

Similar to the displacement strain gauge 1246 shown in FIG. 14C, the strain gauge 1346 also includes resistive components 1346a, 1346b, 1346c and 1346d. When the displacement of the voice coil structure 1340 is outwards, or upwards away from the axial post 1310, a top surface of the strain gauge 1346 becomes under a compressive strain so that the overall resistance is reduced. When the displacement of the voice coil structure 1340 is inwards, or downwards towards the axial post 1310, a top surface of the displacement strain gauge 1346 becomes under a tensile strain so that the overall resistance increases.

In some embodiments, the position sensor 124 and/or system controller 122 can receive the resistive measurement values for determining the displacement of the voice coil structure 1240 relative to its initial position.

Figures 18A, 18B:
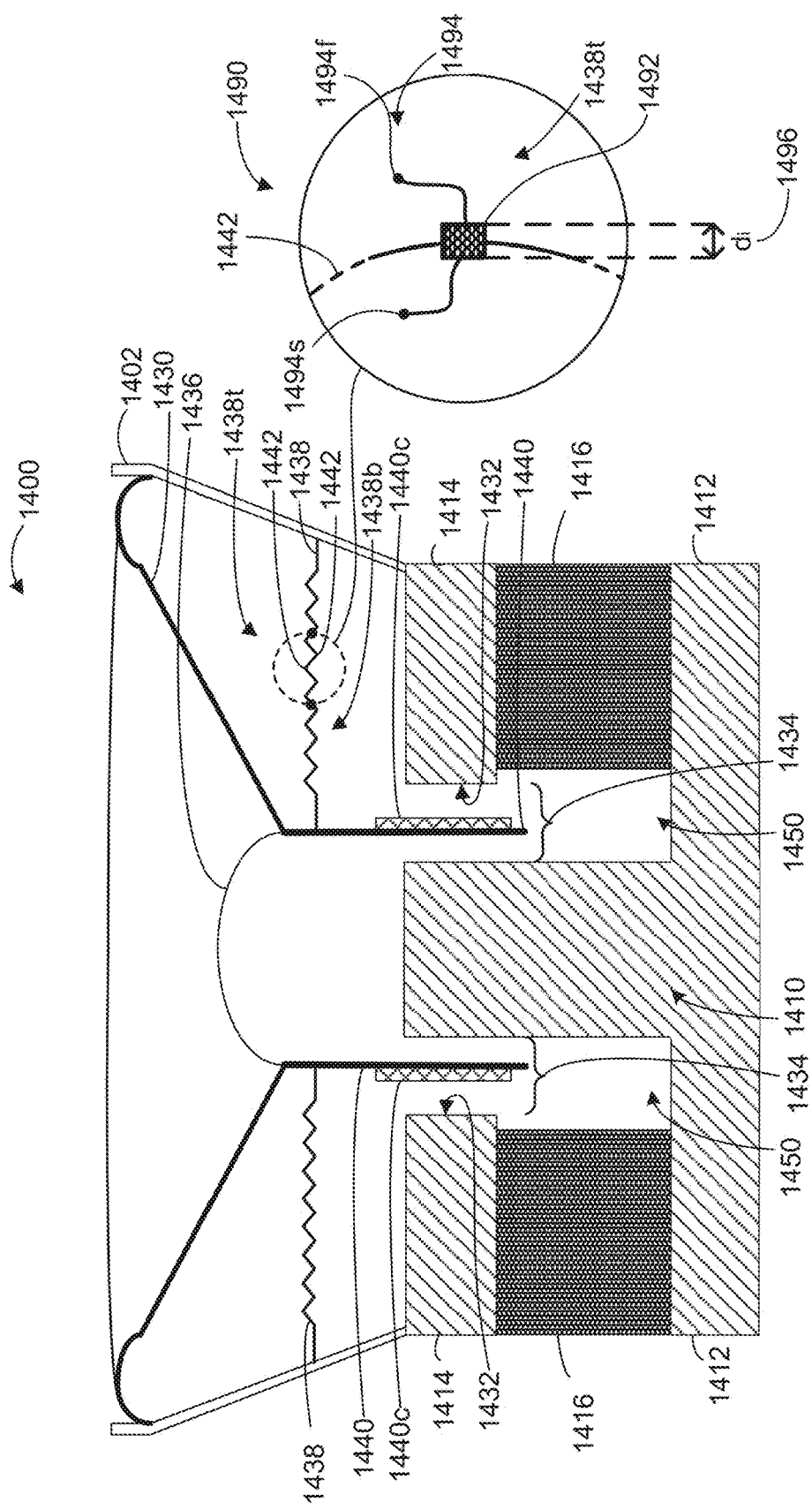
FIG. 18A is a cross-sectional view of yet another example driver operable in the acoustic transducer systems described herein.
FIG. 18B is a plan view of a portion of a spider of the driver shown in FIG. 18A.

FIGS. 18A to 20B illustrate another embodiment involving position sensing based on strain measurements. FIG. 18A is a cross-sectional view of another example driver 1400. The driver 1400 is generally similar to the driver 1200 shown in FIG. 14A. For example, the driver 1400 also includes, at least, an axial post 1410, a bottom plate 1412 extending away from the axial post 1410, and a top plate 1414 with an interior surface 1432 facing the axial post 1410. A magnetic element 1416 can be positioned between the bottom plate 1412 and the top plate 1414. The magnetic element 1416 can be spaced away from the axial post 1410 so that a driver cavity 1450 can be provided.

The top plate 1414 and the axial post 1410 also define an air gap 1434 therebetween. A voice coil 1440c can be wound around a voice coil structure 1440. The voice coil structure 1440 can be operably coupled to the diaphragm 1430 and can move at least partially within the air gap 1434 axially with respect to the driver 1400.

The diaphragm 1430 is operably coupled with the voice coil structure 1440 and also includes a dust cap 1436. A spider 1438 is also coupled with the voice coil structure 1440 and a frame 1402 of the driver 1400. For ease of reference, a top surface of the spider 1438 is shown generally in FIG. 18A as 1438t and a bottom surface of the spider 1438 is shown generally in FIG. 18A as 1438b.

Unlike the driver 1200, a piezoelectric strain sensor 1492 is provided at the spider 1438 of the driver 1400 instead of the resistive strain gauge sensor 1392. FIG. 18B is a plan view 1490 of a portion of the spider 1438 of the driver 1400 shown in FIG. 18A.

As shown in FIG. 18B, the piezoelectric strain sensor 1492 can be positioned at an apex 1442 at the top surface 1438t of the spider 1438. In some embodiments, the piezoelectric sensor 1492 can be provided at the bottom surface 1438b.

Although only one piezoelectric sensor 1492 is shown in FIGS. 18A to 20B, more than one piezoelectric sensor 1492 may be provided at the spider 1438. In some embodiments, multiple piezoelectric sensors 1492 can be positioned on both the top surface 1438t and the bottom surface 1438b of the spider 1438.

Similar to the effect of including additional resistive strain gauge sensors 1292 in the driver 1200, including additional piezoelectric sensors 1492 can also provide additional measurement values so that the overall strain measurement can increase in sensitivity and accuracy. In some embodiments, more than one group of piezoelectric sensors 1492 can be positioned radially around the spider 1238. Each group of piezoelectric sensors 1492 can include one or more piezoelectric sensors 1492. In some embodiments, three or four groups of piezoelectric sensors 1492 can be positioned at the spider 1238. In some embodiments, each group of piezoelectric sensors 1492 can be spaced apart substantially equiangular with respect to the perimeter of the spider 1238. The electrical charge (Q) or voltage measurements received via those piezoelectric sensors 1492 can then be considered together for determining the displacement of the voice coil structure 1440 relative to its initial position.

For example, each of the strain measurements from each piezoelectric sensor 1492 may be summed to provide the overall strain measurement. In some embodiments, the electrical charge (Q) or voltage measurements received from two or more groups of piezoelectric sensors 1492 at the spider 1438 can be averaged to generate an overall resistive measurement for determining the corresponding displacement of the voice coil structure 1440 relative to its initial position.

During operation of the driver 1400, the shape of the apex 1442 changes with the movement of the diaphragm 1430. When the piezoelectric sensor 1492 is at a resting position, the piezoelectric sensor 1492 has an initial length "$d_i$" 1496. As will be described with reference to FIGS. 19A to 20B, the length of the piezoelectric sensor 1492, and the corresponding electrical charge produced by the piezoelectric sensor 1492, will vary during the operation of the driver 1400.

As shown in FIG. 18B, the piezoelectric sensor 1492 has two measurement terminals 1494, namely a first terminal 1494f and a second terminal 1494s. For example, the piezoelectric sensor 1492 can generate a voltage or charge (Q) value that is representative of the strain applied to it and based on that voltage or charge (Q) value, a displacement of the voice coil structure 1440 relative to its initial position can be determined.

FIG. 19A shows the driver 1400 at a first operating state. In the first operating state, the voice coil structure 1440 and the diaphragm 1430 are moving upwards away from the axial post 1410. As a result, the apex 1442 is expanded and the piezoelectric sensor 1492 is also extended. FIG. 19B illustrates the expanded piezoelectric sensor 1492' with a length "$d_1$" 1496', which is longer than the initial length "$d_i$" 1496. A voltage or charge (Q) value of a defined polarity can then be produced at the first and second terminals 1494f and 1494s of the expanded piezoelectric sensor 1492'.

FIG. 20A shows the driver 1400 at a second operating state. In the second operating state, the voice coil structure 1440 and the diaphragm 1430 are moving downwards towards the axial post 1410. As a result, the spider 1438 is expanded and the piezoelectric sensor 1492 is also expanded. FIG. 20B illustrates the expanded piezoelectric sensor 1492" with a length "$d_2$" 1496", which is longer than the initial length "$d_i$" 1496. Similar to the expanded piezoelectric sensor 1492' a voltage or charge (Q) value of a defined polarity is produced at the first and second terminals 1494f and 1494s of the expanded piezoelectric sensor 1492".

To facilitate the determination of a displacement direction of the voice coil structure 1440, the driver 1400 may, in some embodiments, include the displacement direction strain gauge 1246 (as shown in FIG. 14C) at an outer perimeter of the spider 1438.

Various embodiments have been described herein by way of example only. Various modification and variations may be made to these example embodiments without departing from the spirit and scope of the invention, which is limited only by the appended claims.

I claim:

1. An acoustic transducer system comprising:
   a driver motor comprising:
     an axial post;
     a bottom plate extending away from the axial post;
     a top plate having an interior surface facing the axial post, the top plate and the axial post defining an air gap therebetween; and
     a magnetic element positioned between the bottom plate and the top plate, the magnetic element being spaced away from the axial post and the magnetic element operable to generate a magnetic flux;
   a moving assembly comprising:
     a diaphragm; and
     a voice coil structure coupled to the diaphragm, the voice coil structure being movable at least partially within the air gap in response to the magnetic flux;
   a position sensor for generating a position signal representing a displacement of the diaphragm relative to a reference position of the diaphragm, the position sensor comprising:
     a light transmitting component for transmitting an incident light towards the moving assembly; and
     an optical detecting component for receiving a reflected optical signal from a reflective target region located at one of the voice coil structure and the diaphragm, and the reflective target region comprises a first reflective target region for reflecting a first portion of the incident light variably according to the displacement of the diaphragm and a second reflective target region for reflecting a second portion of the incident light, the second portion of the incident light corresponding to a reference signal, wherein the position signal is generated based on the reflected optical signal; and
   a system controller in electronic communication with the driver motor and the position sensor, the system controller operating to modify an input audio signal from an input terminal based on the position signal received from the position sensor, and to transmit the modified input audio signal to a voice coil coupled to the voice coil structure, the voice coil moving at least partially within the air gap in response to the modified input audio signal.

2. The acoustic transducer system of claim 1, wherein the position sensor is operable to generate the position signal based on the reflected optical signal and a reflected reference signal.

3. The acoustic transducer system of claim 1, wherein the light transmitting component comprises a light transmitter for transmitting the incident light towards the diaphragm and the optical detecting component comprises an optical detector for receiving the reflected optical signal from the diaphragm.

4. The acoustic transducer system of claim 1 further comprises a sensor support and the position sensor is mounted to the sensor support.

5. The acoustic transducer system of claim 1, wherein the voice coil structure moves axially at least partially within the air gap in response to the magnetic flux.

6. The acoustic transducer system of claim 1, wherein each of the light transmitting component and the optical detecting component comprises a set of fiber optic cables.

7. The acoustic transducer system of claim 6, wherein at least one fiber optic cable of the set of fiber optic cables comprises a fiber optic bundle.

8. The acoustic transducer system of claim 1 further comprises a sensor support; and
   the light transmitting component comprises a first fiber optic cable for transmitting the incident light towards the diaphragm and the optical detecting component comprises a second fiber optic cable for receiving the reflected optical signal from the diaphragm, each of the first fiber optic cable and the second fiber optic cable being provided via an aperture defined in the sensor support.

9. The acoustic transducer system of claim 8, wherein a probe tip of at least one of the first fiber optic cable and the second fiber optic cable is coupled with an optical component, the optical component coupled to the first fiber optic cable directing the transmission of the incident light towards the diaphragm and the optical component coupled to the second fiber optic cable directing the reflected optical signal towards the position sensor.

10. The acoustic transducer system of claim 9, wherein the optical component comprises at least one of a prism, a lens and a mirror.

11. The acoustic transducer system of claim 1, wherein the reflected optical signal has an operational wavelength.

12. The acoustic transducer system of claim 11, wherein the operational wavelength includes a range of wavelengths.

13. The acoustic transducer system of claim 1, wherein the incident light transmitted by the light transmitting component has a modulation and the optical detecting component is sensitive to the modulation.

14. The acoustic transducer system of claim 1, further including one or more filters positioned between the reflective target region and the optical detecting component.

15. An acoustic transducer system comprising:
   a driver motor comprising:
     an axial post;
     a bottom plate extending away from the axial post;
     a top plate having an interior surface facing the axial post, the top plate and the axial post defining an air gap therebetween; and
     a magnetic element positioned between the bottom plate and the top plate, the magnetic element being spaced away from the axial post and the magnetic element operable to generate a magnetic flux;
   a moving assembly comprising:

a diaphragm having an inner surface facing the axial post and an exterior surface facing away from the axial post; and a voice coil structure coupled to the diaphragm, the voice coil structure being movable at least partially within the air gap in response to the magnetic flux;

a position sensor located external to the driver motor for generating a position signal representing a displacement of the diaphragm relative to a reference position of the diaphragm, the position sensor comprising:

a light transmitting component for transmitting an incident light towards the exterior surface of the diaphragm; and an optical detecting component for receiving a reflected optical signal corresponding to a reflection of the incident light from a reflective target region provided at the exterior surface of the diaphragm, the position signal being generated based on the reflected optical signal, the reflective target region comprises a first reflective target region for reflecting a first portion of the incident light variably according to the displacement of the diaphragm and a second reflective target region for reflecting a second portion of the incident light, the second portion of the incident light corresponding to a reference signal; and a system controller in electronic communication with the driver motor and the position sensor, the system controller operating to modify an input audio signal from an input terminal based on the position signal received from the position sensor, and to transmit the modified input audio signal to a voice coil coupled to the voice coil structure, the voice coil moving at least partially within the air gap in response to the modified input audio signal.

16. The acoustic transducer system of claim 15, wherein the position sensor is operable to generate the position signal based on the reflected optical signal and a reflected reference signal.

17. The acoustic transducer system of claim 15, further including one or more filters positioned between the reflective target region and the optical detecting component.

* * * * *